(12) United States Patent  (10) Patent No.: US 7,026,939 B2
Letkomiller et al.  (45) Date of Patent: Apr. 11, 2006

(54) LIVESTOCK DATA ACQUISITION AND COLLECTION

(75) Inventors: Joseph Letkomiller, Thornton, CO (US); Dale Yones, Longmont, CO (US); Paul Baker, Lafayette, CO (US)

(73) Assignee: Phase IV Engineering, Inc., Boulder, CO (US)

( * ) Notice: Subject to any disclaimer, the term of this patent is extended or adjusted under 35 U.S.C. 154(b) by 315 days.

(21) Appl. No.: 10/360,914

(22) Filed: Feb. 10, 2003

(65) Prior Publication Data

US 2004/0155782 A1  Aug. 12, 2004

(51) Int. Cl.
G08B 13/14 (2006.01)
(52) U.S. Cl. .................. 340/572.7; 340/573.3
(58) Field of Classification Search ........... 340/572.7, 340/573.3, 825.49; 119/51.02, 174; 235/375, 235/376, 435, 436, 437, 491
See application file for complete search history.

(56) References Cited

U.S. PATENT DOCUMENTS

| 3,893,111 A | | 7/1975 | Cotter ................. 343/6.5 R |
| 4,243,980 A | * | 1/1981 | Lichtblau ............... 340/572.7 |
| 4,260,990 A | * | 4/1981 | Lichtblau ................. 343/742 |
| 4,262,632 A | | 4/1981 | Hanton et al. ................ 119/1 |
| 4,399,821 A | | 8/1983 | Bowers ..................... 128/630 |
| 4,475,481 A | | 10/1984 | Carroll .................... 119/51 R |
| 4,617,876 A | | 10/1986 | Hayes ...................... 119/155 |
| 4,679,046 A | * | 7/1987 | Curtis et al. ................. 342/51 |
| 5,252,962 A | | 10/1993 | Urbas et al. ............ 340/870.17 |
| 5,335,664 A | | 8/1994 | Nagashima ................ 128/696 |
| 5,428,008 A | | 6/1995 | Chao et al. .................... 514/8 |
| 5,481,262 A | | 1/1996 | Urbas et al. ............ 340/870.17 |
| 5,499,626 A | | 3/1996 | Willham et al. ............ 128/630 |
| 5,697,384 A | | 12/1997 | Miyawaki et al. .......... 128/899 |
| 5,724,030 A | | 3/1998 | Urbas et al. ............ 340/870.17 |
| 5,818,354 A | | 10/1998 | Gentry ................... 340/870.16 |
| 5,880,675 A | | 3/1999 | Trautner .................... 340/572 |
| 5,984,875 A | | 11/1999 | Brune ....................... 600/549 |
| 5,995,006 A | | 11/1999 | Walsh .................... 340/572.7 |
| 6,012,415 A | | 1/2000 | Linseth ...................... 119/174 |

(Continued)

FOREIGN PATENT DOCUMENTS

GB  2308947 A  9/1997

OTHER PUBLICATIONS

Finkenzeller, Klaus. RFID Handbook. 1999. John Wiley & Son, Ltd. pp. 159-163.*

Primary Examiner—John Tweel, Jr.
(74) Attorney, Agent, or Firm—Kilpatrick Stockton LLP

(57) ABSTRACT

Acquiring and collecting data from a subject animal. A system includes a passive data acquisition device associable with a subject animal including: a sensor, a radio frequency identification (RFID) transponder, and a magnet separate form the transponder. The system also includes a transceiver operable to activate the data acquisition device and to receive and demodulate an RFID telegram from the data acquisition device sent in response to the activation. The transceiver includes an activation antenna configured to encompass areas of substantially equal and substantially opposite flux and a receive antenna configured symmetrically along an axis of symmetry of the activation antenna. The RFID telegram from the data acquisition device to the transceiver comprises an ISO 11784-compliant identification code containing sensor data in the reserved field of the code. In another embodiment, the RFID telegram comprises a modified ISO 11785 telegram.

3 Claims, 16 Drawing Sheets

U.S. PATENT DOCUMENTS

| | | | |
|---|---|---|---|
| 6,166,637 A * | 12/2000 | Cyr et al. | 340/572.7 |
| 6,283,065 B1 | 9/2001 | Shorrock et al. | 119/863 |
| 6,294,997 B1 | 9/2001 | Paratore et al. | 340/572.1 |
| 6,329,920 B1 * | 12/2001 | Morrison et al. | 340/573.3 |
| 6,371,927 B1 | 4/2002 | Brune et al. | 600/549 |
| 6,664,897 B1 * | 12/2003 | Pape et al. | 340/573.3 |
| 6,700,547 B1 * | 3/2004 | Mejia et al. | 343/743 |
| 2002/0010390 A1 | 1/2002 | Guice et al. | |

* cited by examiner

| Bit No. | USE | bit value | Bit No. | USE | bit value | Bit No. | USE | bit value | Bit No. | USE | bit value |
|---|---|---|---|---|---|---|---|---|---|---|---|
| 1 | cal_type | CT_3 | 65 | TB0 | TB0-8 | 129 | ISO national code | x | 193 | | 0 |
| 2 | cal_type | CT_2 | 66 | TB0 | TB0-7 | 130 | ISO national code | x | 194 | | 0 |
| 3 | cal_type | CT_1 | 67 | TB0 | TB0-6 | 131 | ISO national code | x | 195 | | 0 |
| 4 | Cal Adjust | CA_3 | 68 | TB0 | TB0-5 | 132 | ISO national code | x | 196 | ISO trailer | 0 |
| 5 | Cal Adjust | CA_2 | 69 | TB0 | TB0-4 | 133 | ISO national code | x | 197 | | 0 |
| 6 | Cal Adjust | CA_1 | 70 | cntl | 1 | 134 | MFG CODE | MSB | 198 | | 0 |
| 7 | | 1 | 71 | | msb | 135 | MFG CODE | LSB | 199 | | 0 |
| 8 | Tab0 | Tab0-6 | 72 | 8-bit CRC | x | 136 | MFG CODE | x | 200 | cntl | 1 |
| 9 | Tab0 | Tab0-5 | 73 | 8-bit CRC | x | 137 | cntl | 1 | 201 | | 0 |
| 10 | Tab0 | Tab0-4 | 74 | 8-bit CRC | x | 138 | | x | 202 | | 0 |
| 11 | Tab0 | Tab0-3 | 75 | 8-bit CRC | x | 139 | | x | 203 | | 0 |
| 12 | Tab0 | Tab0-2 | 76 | 8-bit CRC | x | 140 | | x | 204 | ISO trailer | 0 |
| 13 | Tab0 | Tab0-1 | 77 | 8-bit CRC | x | 141 | ISO MFG CODE | x | 205 | ISO trailer | 0 |
| 14 | Tab1 | Tab1-6 | 78 | | lsb | 142 | ISO MFG CODE | x | 206 | | 0 |
| 15 | Tab1 | Tab1-5 | 79 | cntl | 1 | 143 | | x | 207 | | 0 |
| 16 | | 1 | 80 | ALL 1'S | 1 | 144 | | x | 208 | | 0 |
| 17 | Tab1 | Tab1-4 | 81 | | 1 | 145 | | MSB | 209 | cntl | 1 |
| 18 | Tab1 | Tab1-3 | 82 | | 0 | 146 | cntl | 1 | 210 | TB0 | TB0-3 |
| 19 | Tab1 | Tab1-2 | 83 | | 0 | 147 | DBF | 1 | 211 | TB0 | TB0-2 |
| 20 | Tab1 | Tab1-1 | 84 | | 0 | 148 | | 0 | 212 | TB0 | TB0-1 |
| 21 | Tab2 | Tab2-6 | 85 | | 0 | 149 | | 0 | 213 | TB | TB-11 |
| 22 | Tab2 | Tab2-5 | 86 | ISO header | 0 | 150 | ISO reserved | 0 | 214 | TB | TB-10 |
| 23 | Tab2 | Tab2-4 | 87 | ISO header | 0 | 151 | ISO reserved | 0 | 215 | TB | TB-9 |
| 24 | Tab2 | Tab2-3 | 88 | ISO header | 0 | 152 | ISO reserved | 0 | 216 | TB | TB-8 |
| 25 | | 1 | 89 | | 0 | 153 | | 0 | 217 | TB | TB-7 |
| 26 | Tab2 | Tab2-2 | 90 | | 0 | 154 | | 0 | 218 | cntl | 1 |
| 27 | Tab2 | Tab2-1 | 91 | | 0 | 155 | cntl | 1 | 219 | TB | TB-6 |
| 28 | Tab3 | Tab3-6 | 92 | | 1 | 156 | | 0 | 220 | TB | TB-5 |
| 29 | Tab3 | Tab3-5 | 93 | | LSB | 157 | | 0 | 221 | TB | TB-4 |
| 30 | Tab3 | Tab3-4 | 94 | ISO national code | x | 158 | ISO reserved | 0 | 222 | TB | TB-3 |
| 31 | Tab3 | Tab3-3 | 95 | ISO national code | x | 159 | ISO reserved | 0 | 223 | TB | TB-2 |
| 32 | Tab3 | Tab3-2 | 96 | ISO national code | x | 160 | | 0 | 224 | TB | TB-1 |
| 33 | Tab3 | Tab3-1 | 97 | ISO national code | x | 161 | | 0 | 225 | NT | NT14 |
| 34 | | 1 | 98 | | x | 162 | | 0 | 226 | NT | NT13 |
| 35 | Tab4 | Tab4-6 | 99 | | x | 163 | A-NA F | 1 | 227 | cntl | 1 |
| 36 | Tab4 | Tab4-2 | 100 | | x | 164 | cntl | 1 | 228 | NT | NT12 |
| 37 | Tab4 | Tab4-3 | 101 | cntl | 1 | 165 | | LSB | 229 | NT | NT11 |
| 38 | Tab4 | Tab4-4 | 102 | | x | 166 | | x | 230 | NT | NT10 |
| 39 | Tab4 | Tab4-5 | 103 | | x | 167 | ISO 16-bit CRC LSB/lsb | x | 231 | NT | NT9 |
| 40 | Tab4 | Tab4-6 | 104 | ISO national code | x | 168 | ISO 16-bit CRC LSB/lsb | x | 232 | NT | NT8 |
| 41 | Tab5 | Tab5-1 | 105 | ISO national code | x | 169 | ISO 16-bit CRC LSB/lsb | x | 233 | NT | NT7 |
| 42 | Tab5 | Tab5-2 | 106 | ISO national code | x | 170 | ISO 16-bit CRC LSB/lsb | x | 234 | NT | NT6 |
| 43 | | 1 | 107 | | x | 171 | | x | 235 | NT | NT5 |
| 44 | Tab5 | Tab5-3 | 108 | | x | 172 | | x | 236 | cntl | 1 |
| 45 | Tab5 | Tab5-4 | 109 | | x | 173 | cntl | 1 | 237 | NT | NT4 |
| 46 | Tab5 | Tab5-5 | 110 | cntl | 1 | 174 | | x | 238 | NT | NT3 |
| 47 | Tab5 | Tab5-6 | 111 | | x | 175 | | x | 239 | NT | NT2 |
| 48 | Tab6 | Tab6-6 | 112 | | x | 176 | ISO 16-bit CRC MSB/msb | x | 240 | NT | NT1 |
| 49 | Tab6 | Tab6-5 | 113 | ISO national code | x | 177 | ISO 16-bit CRC MSB/msb | x | 241 | | 1 |
| 50 | Tab6 | Tab6-4 | 114 | ISO national code | x | 178 | ISO 16-bit CRC MSB/msb | x | 242 | parity | 1 |
| 51 | Tab6 | Tab6-3 | 115 | ISO national code | x | 179 | ISO 16-bit CRC MSB/msb | x | 243 | parity | 1 |
| 52 | | 1 | 116 | | x | 180 | | MSB | 244 | | 1 |
| 53 | Tab6 | Tab6-2 | 117 | | x | 181 | | MSB | 245 | cntl | 1 |
| 54 | Tab6 | Tab6-1 | 118 | | x | 182 | cntl | 1 | 246 | cntl | 1 |
| 55 | Tab7 | Tab7-6 | 119 | cntl | 1 | 183 | | 0 | 247 | | |
| 56 | Tab7 | Tab7-5 | 120 | | x | 184 | | 0 | 248 | parity | |
| 57 | Tab7 | Tab7-4 | 121 | | x | 185 | | 0 | 249 | | |
| 58 | Tab7 | Tab7-3 | 122 | ISO national code | x | 186 | ISO trailer | 0 | 250 | mtms | |
| 59 | Tab7 | Tab7-2 | 123 | ISO national code | x | 187 | ISO trailer | 0 | 251 | | 1 |
| 60 | Tab7 | Tab7-1 | 124 | ISO national code | x | 188 | | 0 | 252 | hardwired 1's | 1 |
| 61 | | 1 | 125 | | x | 189 | | 0 | 253 | hardwired 1's | 1 |
| 62 | TB0 | TB0-11 | 126 | | x | 190 | | 0 | 254 | hardwired 1's | 1 |
| 63 | TB0 | TB0-10 | 127 | | x | 191 | cntl | 1 | 255 | hardwired 1's | 1 |
| 64 | TB0 | TB0-9 | 128 | cntl | 1 | 192 | trailer | 0 | 256 | hardwired 1's | 1 |

FIG. 3

«LIVESTOCK DATA ACQUISITION AND COLLECTION

FIELD OF THE INVENTION

Embodiments of the present invention relate to systems and methods for acquiring and collecting data on livestock. In particular, preferred embodiments relate to systems and methods for acquiring and collecting temperature data from ruminants using ingestible boluses.

BACKGROUND

The identity and physiological condition of livestock is of paramount importance to owners, buyers, and processors of livestock. It is known to visually identify livestock using brands or ear tags. It is also known to identify livestock using radio frequency identification (RFID) tags, e.g., in the form of an ear tag, an injectable tag, or an ingestible bolus. By including a sensor with the RFID tag, it is possible to collect indications of physiological characteristics, e.g., temperature.

In addition, livestock are known to ingest fragments of metal, e.g., wire from hay bales or barbed wire, that can induce traumatic reticuloperitonitis, a.k.a. "hardware disease." Hardware disease is an infection caused when the stomach wall is penetrated by ingested metal. To reduce the risk of hardware disease, it is known to place one or more magnet boluses into the reticulum of livestock to attract such metal objects.

SUMMARY OF THE INVENTION

In a preferred embodiments, the invention includes a system for acquiring data from a subject animal. The system includes a passive data acquisition device and a transceiver. The data acquisition device is associable with a subject animal. The data acquisition device includes a sensor operable to provide sensor data relating to the subject animal and a radio frequency identification (RFID) transponder operable to transmit an RFID telegram comprising the sensor or data. In some embodiments, the RFID telegram includes an ISO 11784-compliant identification code containing sensor data in the reserved field of the code. In other embodiments, the RFID telegram includes an ISO 11785-formatted full duplex identification telegram, with the sensor data outside the ISO 11785-formatted full duplex identification telegram. In those embodiments, a first portion of the ISO 11785-formatted full duplex telegram is contained in a portion of the RFID telegram intended for transmit during an initial ISO 11785 activation period, and a second portion of the ISO 11785-formatted full duplex telegram is contained in a portion of the RFID telegram intended for transmit during an extended ISO 11785 activation period. The data acquisition device further includes at least one magnet separate from the transponder. The transceiver is operable to activate the data acquisition device and to receive and demodulate the RFID telegram from the data acquisition device sent in response to the activation. The transceiver includes an activation antenna configured to encompass areas of substantially equal and substantially opposite flux and a receive antenna configured symmetrically along an axis of symmetry of the activation antenna.

In other embodiments, the invention includes a data acquisition device associable with a subject animal. The data acquisition device includes a sensor operable to provide sensor data relating to a subject animal, an RFID transponder operable to transmit RFID and the sensor data, and a magnet separate from the transponder.

In additional embodiments, the invention includes a data acquisition device associable with a subject animal. The device includes a sensor operable to provide sensor data relating to a subject animal and a radio frequency identification (RFID) transponder operable to transmit an RFID telegram comprising an ISO 11784-compliant identification code containing sensor data in the reserved field of the code. In a similar embodiment the RFID telegram includes an ISO 11785-formatted full duplex identification telegram, and the sensor data outside the ISO 11785-formatted full duplex identification telegram. In these embodiments, a first portion of the ISO 11785-formatted full duplex telegram is contained in a portion of the RFID telegram intended for transmit during an initial ISO 11785 activation period, and a second portion of the ISO 11785-formatted full duplex telegram is contained in a portion of the RFID telegram intended for transmit during an extended ISO 11785 activation period. Further embodiments of the invention include a receiver, the receiver operable to receive and demodulate radio frequency identification (RFID) telegrams as described above.

In other embodiments of the invention a transceiver includes an activation antenna configured to encompass areas of substantially equal and substantially opposite flux and a receive antenna configured symmetrically along an axis of symmetry of the activation antenna. In preferred embodiments including this feature the activation antenna is configured as a figure eight and the receive antenna is configured as a single rectangle. The receive antenna is configured as two coils, each coil disposed substantially symmetrically within a side of the activation antenna.

DESCRIPTION OF THE DRAWINGS

Each drawing is exemplary of the characteristics and relationships described thereon in accordance with preferred embodiments of the present invention.

FIG. 3 illustrates an RFID telegram of the present invention.

DETAILED DESCRIPTION

As required, detailed embodiments of the present invention are disclosed herein. However, it is to be understood that details and features of the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention. In preferred embodiments, system components are individually and collectively configured and interrelated as described herein.

Figure 1:
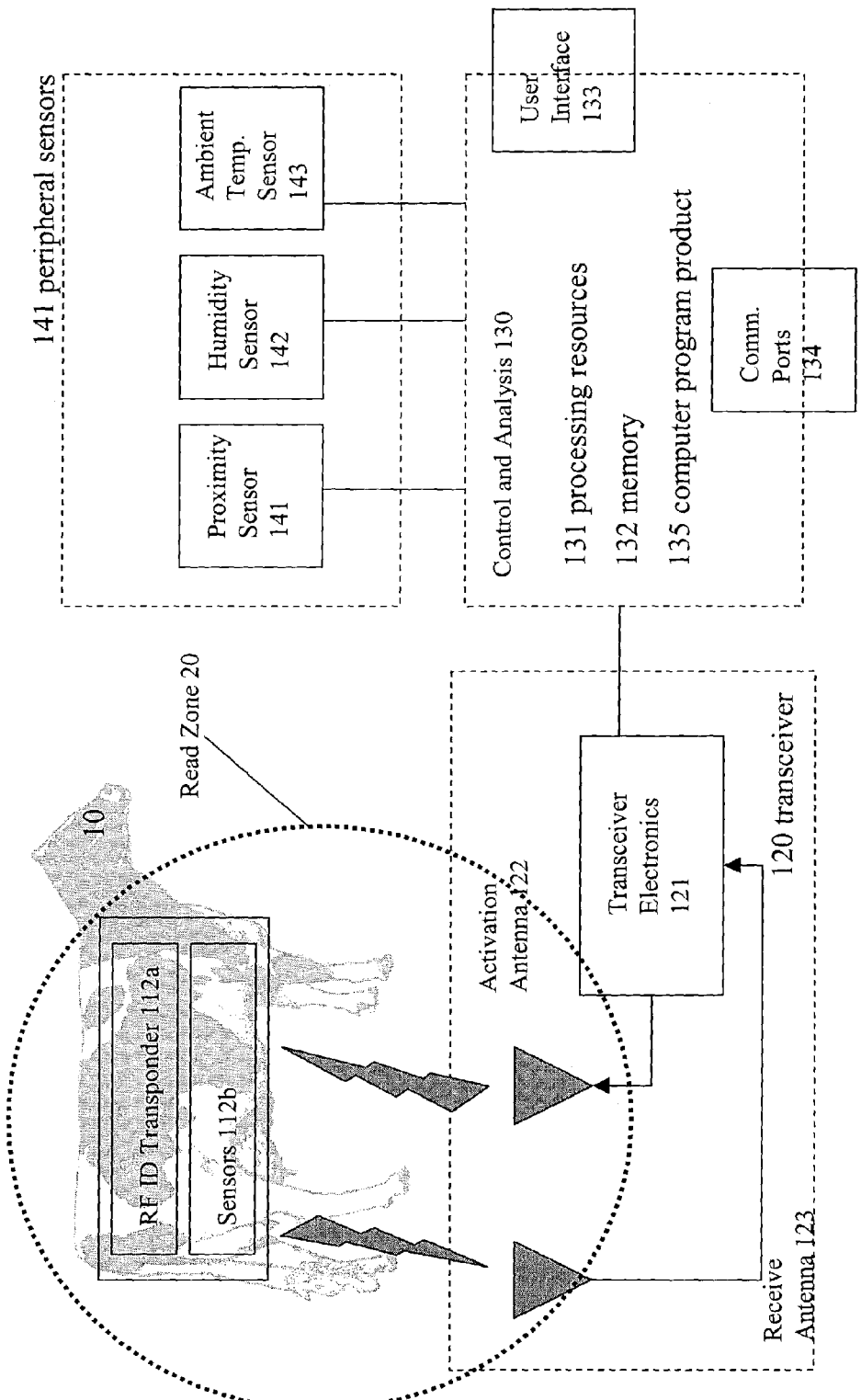
FIG. 1 is a functional block diagram of a preferred embodiment of a system of the present invention.

Referring to FIG. 1, a functional block diagram of a livestock data acquisition and collection system in accordance with a preferred embodiment of the present invention is illustrated. The system 100 includes: a data acquisition device 110, a transceiver 120, a control and analysis subsystem 130, and a set of peripheral sensors 140.

The data acquisition device 110 comprises an RFID transponder 112*a* and at least one sensor 112*b*. The transceiver 120 comprises transceiver electronics 121, an activation antenna 122, and a receive antenna 123. The control and analysis subsystem 130 comprises processing resources 131, memory 132, a user interface 133, communications port 134, and a computer program product 135 controlling the operation of the control and analysis subsystem 130. The set of peripheral sensors 140 includes one or more proximity sensors 141, a humidity sensor 142, and an ambient temperature sensor 143.

With further reference to FIG. 1, in an illustrative mode of operation, upon detection of a subject animal 10 within the read zone 20, e.g., by a signal from the proximity sensor 141, the control and analysis subsystem 130 commands the transceiver 120 to transmit activation energy through the activation antenna 122 into the read zone 20. An RFID transponder 112*a* present in the read zone 20 (and preferably associated with the subject 10) is activated by this energy and transmit an RFID code and data from the sensor 112*b*. The receive antenna 123 receives the transponder transmission, which is demodulated by the transceiver electronics 121. This demodulated information along with data from the humidity sensor 142 and ambient temperature sensor 143 is passed to the control and analysis subsystem 130 for analysis by the processor 131. Processed results are stored in memory 132 and made available through the user interface 133 and the communications ports 134.

The system, via the control and analysis subsystem 130, can communicate with external devices and users via several communications ports 134, e.g., RS-232, RS-422, Ethernet, wireless such a Bluetooth, IEEE 802.11b, firewire, and universal serial bus (USB), among other communication ports known to those skilled in the art. Other possible interfaces include infrared (IR) and serial interfaces compatible with Personal Digital Assistants (PDAs) such as the Compaq™ Ipaq™. The control and analysis subsystem 130 includes a computer program product 135 to control system elements for collection of information from the data acquisition device 110 and-peripheral sensors 140, to interface with external devices and users, and to convert acquired information to comma-delimited data compatible with most commercially available spreadsheet, database, or data acquisition and analysis software.

In preferred embodiments, comma-delimited data derived from the data acquisition device is of the form "<control character indicating new data field><control character indicating data type><ambient temperature in degrees F>, <bolus ISO ID>, <bolus manufacturer ID>, <transceiver ID>, <checksum>". For example, "~B102.4,000000054143, 0999,R1,XX" indicates a new field (~) of bolus data (B) with bolus temperature 102.4 F, bolus ISO ID 000000054143, bolus manufacturer 999, reader R1, checksum XX (one's complement of the exclusive OR of the entire string). In preferred embodiments, comma delimited data derived from peripheral sensors is of the form "<control character indicating new data field><control character indicating data type><ambient temperature in degrees F>, <relative humidity in %>, <reader ID>, <checksum>". For example, "~T70.8,34,R1,XX" indicates a new field (~) of peripheral sensor data (T) with ambient temperature 70.8, humidity 34%, reader R1, checksum XX (one's complement of the exclusive OR of the entire string).

Figure 2:
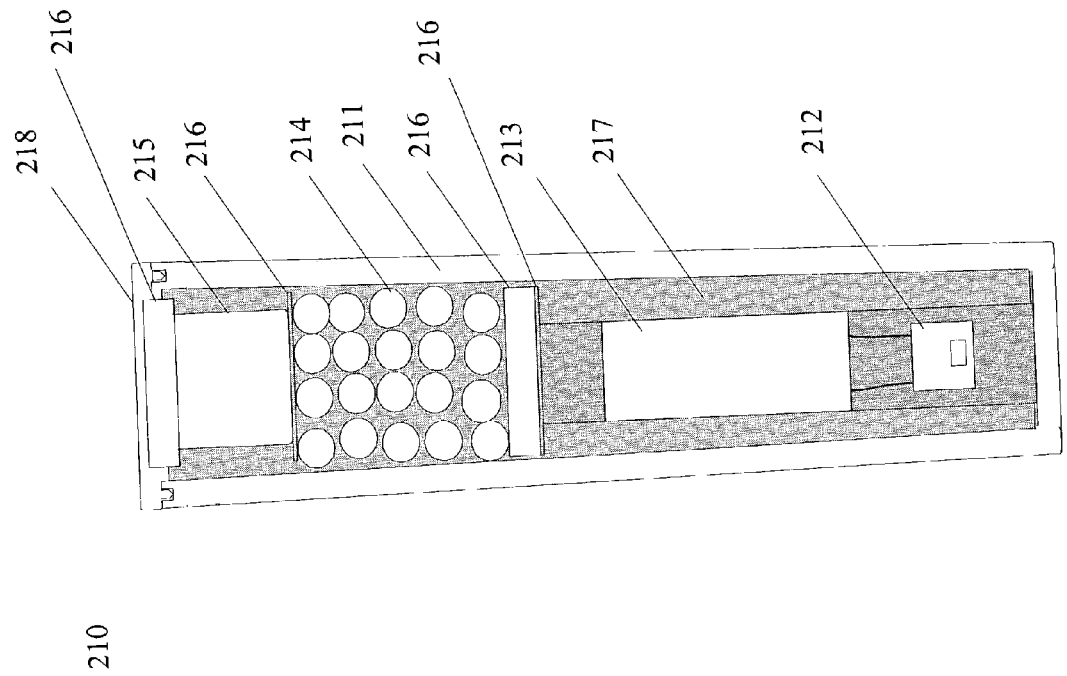
FIG. 2 is a schematic cutaway diagram of a bolus of the present invention.

Referring to FIG. 2, an exemplary data acquisition device 110 of the present invention is shown as an ingestible bolus 210. In some embodiments, the device is a tag worn externally by the livestock; in other embodiments it is an injectable device—in either case it exhibits functionality similar to that of the bolus described herein. The bolus 210 is comprised of a bolus tube 211 containing a printed circuit board (PCB) 212 on which an RFID transponder 112*a* and a sensor 112*b* are provided. The bolus further comprises a coil/ferrite assembly 213, ballast 214, a magnet 215, one or more spacers 216, filler 217, and a cap 218. In preferred embodiments, the PCB 212 includes a thermistor as a temperature sensor 112*b*. Sensors for other characteristics, e.g., heart rate, ph, are contemplated. It is also contemplated to locate at least a portion of the sensor 212*b* away from, but in communication with, the PCB 212.

In preferred embodiments, the coil/ferrite assembly 213 acts as both a receive and transmit antenna for the bolus 210. In other embodiments, separate bolus receive and transmit antennas are used. As a receive antenna, the coil/ferrite assembly 213 serves to convert received electromagnetic energy to electrical power for powering the PCB 212. In a preferred embodiment, the ferrite is type 77, and is about 2 inches by 0.37 inches, having an inductance of 2.2 mH. The coil is a length of 38 AWG wire, wrapped around the ferrite for 195 turns.

In preferred embodiments, the bolus 210 weighs about 72 grams. About 19 grams of steel, preferably a slug but alternatively steel shot, are used in the bolus tube 211 as ballast 214. A magnet, such as a substantially cylindrical neodymium permanent magnet 215, nominally 35 MGOe, is preferably included in the bolus 210 to reduce the risk of hardware disease in the bolus host. Note that this magnet is separate from the transponder electronics in the bolus. This magnet serves, inter alia, to lower the risk of hardware disease by attracting metal objects. In addition, a combination of spacers 216 is employed to separate bolus components. Depending on the quality of the assembly process and bolus components, spacers can be limited to as little as one between the coil/ferrite 213 and the ballast 214. Bolus internal elements are immersed in an FDA-compliant resin filler 217, e.g., Resin Lab W010802 with barium sulfate having a specific gravity of approximately 1.82. The open end of the bolus tube 211 is sealed with a cap 218, and ultrasonically welded into place at the open end of bolus tube 211. In preferred embodiments, the bolus conforms to FDA indirect food additive list, Title 21 Part 174-178.

The PCB 212 is preferably implemented primarily as an application-specific integrated circuit (ASIC). In some embodiments, the ASIC is a complimentary metal-oxide semiconductor (CMOS) transponder, e.g., an MST032K2 chip. The MST032K2 is a CMOS RFID transponder with 256 bits of memory arranged as 16 rows of 16 bits each. Part of this memory, rows #1 to #12 are electronically erasable programmable read-only memory (EEPROM). Rows #14 and #15 comprise two 16-bit registers that are made up of 14-bits of analog-to-digital conversion registers and two control bits each. These registers are termed Np and Nt in this document. Also, row #14 hardware register (Np) can be turned off and a row of EEPROM enabled that allows data to be programmed in to the part in those locations. The last row #16 comprises 7 bits of parity for the Nt and Np registers, a switch detection bit and six hard-wired bits that transmit as "1". In preferred embodiments of the present invention, row #14 EEPROM is enabled. In some preferred embodiments, the ASIC operates in the temperature mode only. In this mode, the ASIC conforms to the memory map as shown in FIG. 3. In the temperature mode, the parity bits #244, 243, and 244, for the first 12 least significant bits of Np, are transmitted as 1 (see FIG. 3).

In preferred embodiments, the transponder 112a includes the PCB, ASIC chip, and a few passive components known to those skilled in the art, a thermistor 112b, and the coil/ferrite assembly. While the ASIC measures temperature without a thermistor 112b, the temperature resolution of the ASIC is improved by including the thermistor 112b.

Identification and modulation used in communications link between bolus 110, the transceiver 120, and the control and analysis subsystem 130 conform generally to:

International Standard ISO 11784 ('784) *Radio Frequency Identification of Animals—Code Structure*, $2^{nd}$ Ed. Aug. 15, 1996, and International Standard ISO 11785 ('785) *Radio Frequency Identification of Animals—Technical Concept*, $1^{st}$ Ed. Oct. 15, 1996.

Each of these documents is incorporated by reference in its entirety.

The '784 standard describes a code divided into a number of code fields, each with its own meaning. Each field is coded in natural binary with the high order bit being the leftmost bit. The overall structure defines 64 bits as follows: bit number 1 is a flag for animal or non-animal application; bits number 2–15 are reserved; bit number 16 is a flag for indicating the existence of a data block appended to the identification code; bits 17–26 are an ISO 3166 numeric-3 country code; and bits 27–64 are the national identification code for the specific animal. At least one preferred embodiment of the present invention uses the reserved bits 2–15 to encode temperature information; otherwise the identification code of preferred embodiments of the present invention conform to '784 standard.

Preferred embodiments of the present invention employ a modified '785 standard full duplex (FDX) ID telegram. The modified ID telegram meets the standard for activation frequency, modulation, return frequencies, bit encoding, identification code structure, bit order, and bit rate. The '785 standard specifies that the activation period for an FDX system shall be 50 ms, unless an FDX transponder signal is received but not validated. In such a case, the '785 standard calls for the transceiver to extend the activation period until the ID telegram is validated, but no longer than 100 ms. One hundred (100) milliseconds is sufficient time to transmit 256 bits, twice the length of a standard FDX ID telegram. In preferred embodiments of the present invention, 81 bits not included in the standard '785 ID telegram are transmitted first, followed by the standard 128-bit ID telegram in the order and with the control and error correction bits as specified in '785. These bits are followed by 47 bits also not included in the standard '785 ID telegram. Preferred embodiments of the invention utilize the bits not included in the standard ID telegram to transmit sensor data from the data acquisition device.

Referring to FIG. 3 a bit structure of a modified '785 standard ID telegram used in preferred embodiments of the invention is shown. The following provides an example of a validated data acquisition device transmission illustrative of ID telegrams of that type. For a data acquisition device to have been read successfully the following checks must be valid: the reader must see the ISO header; all control bits must be transmitted as "1"s; the 16-bit CRC must check for all the ISO data; the 8-bit CRC must check for the calibration or other non-ISO data; and the parity bits must all check (even parity). Note that the parity bits for Np are not calculated for the 12 1sb bits of the register if the MST032k2 is in temperature only mode. The parity for Np14, Np13, Nt14 and Nt13 is calculated with the values of Nt14 and Nt12 with Np14=Np13=1.

The CRC generator polynomial is selected from IEEE 802.6-1990 and is $$G(x)=x^{}8+x^{}2+x+1 \qquad (1)$$

A nine bit pattern of binary coefficients representing this polynomial is 100000111. This pattern is synthetically divided into the data message and the 8 bit remainder is saved as the CRC byte. Typical pseudocode for generation—or recovery—of the 8-bits CRC is shown below:

```
unsigned char Crc8( unsigned char *p, unsigned char n )
{
    unsigned char crc = 0;      /* CRC accumulator */
    unsigned char b;            /* Data byte */
    unsigned char i;            /* Bit counter */
    CRC_POLY = 0x07;
    while (n-- != 0)
    {
        b = *p++;
        for (i = 8; i != 0; i--)
        {
            if(((b ^ crc) & 0x80) != 0)
                crc = (crc << 1) ^ CRC_POLY;
            else
                crc <<= 1;
            b <<= 1;
        }
    }
    return (crc);
}
```

The '785 standard header (ISO header) is defined as: a header of 11 bits b#00000000001 used to signal the start of a '785 compliant telegram. It consists of ten "0"s followed by a "1". This header is also used to synchronize the transceiver to the data stream. Control bits are defined as a "1" for every ninth bit following the header. Also note that some other bits can also be set to "1". These bits are 80 and 81 before the ISO header and bits 245, 246, and 251–256

(bits 245, 246, and 251–256 are hardwired as '1's in the ASIC). In some embodiments, these bits can be placed to prevent an inadvertent read of the header. The 16-bit CRC is defined as in Annex B of the '785 standard. Data is taken in order from the LSB of the ISO11784 data stream and the CRC performed as defined. On the memory map this data is seen to run from concatenated bits [93–100], [102–109], [111–118], [120–127], [129–136], [138–145], [147–154], and [156–163]. In some embodiments, the trailing data bits have no error checking and should all be "0"s. The bits are applied to the CRC with bit 93 being the least significant bit (LSB) and bit 163 being the most significant bit (MSB) and shifted through the CRC generator LSB to MSB. The resulting CRC is stored at bytes [164–172] and [174–181], LSB to MSB as per the '785 standard. The eight-bit CRC is as defined in the appendix of this document. Bits [1–6], [8–15], [17–24], [26–33], [35–42], [44–51], [53–60], [62–69], [210–217], and [219–224] are concatenated for a total of 76 bits. The bits are sent from the transponder MSB to LSB, with bit in location 1 being the MSB and bit in location 224 being the LSB. The resulting eight-bit CRC is generated with the bits rotated in MSB to LSB and the result stored at location [71–78], MSB to LSB. The parity as defined for the temperature register data is as shown in Table 1. The parity generated for each four bits is EVEN.

TABLE 1

Parity for ASIC Temperature Register Data

| COL ADDRESS OF ROW 16 | FUNCTION | REGISTER LOCATIONS XOR'ed |
|---|---|---|
| CA0 | Parity | $NT_{13}$ & $NT_{14}$, $Np_{13}$ & $NP_{14}$ - In Temp only mode $Np_{13}$ & $NP_{14}$ = 1. |
| CA1 | Parity | $NP_{9-12}$ - transmitted as 1 in Temp only mode |
| CA2 | Parity | $NP_{5-8}$ - transmitted as 1 in Temp only mode |
| CA3 | Parity | $NP_{1-4}$ - transmitted as 1 in Temp only mode |
| CA4 | Control Bit | Hard wired "1" |
| CA5 | Control Bit | Hard wired "1" |
| CA6 | Parity | $NT_{9-12}$ |
| CA7 | Parity | $NT_{5-8}$ |
| CA8 | Parity | $NT_{1-4}$ |
| CA9 | MTMS_IN | MTMS switch state |
| CA10-15 | All 1's control bits | Fixed in hardware |

Once the modified ISO '785 telegram has been validated the data can be manipulated to pull off the ISO ID code and calibration data. Then the temperature can be calculated. In the example of the following paragraphs, the values given in the code for offsets and scaling factors are illustrative only.

From ID telegram bit structure of FIG. 3 the data is arranged as shown in Table 2.

TABLE 2

| Constant | Bit [msb to lsb] | Note: |
|---|---|---|
| Cal_type | [1–3] | Wafers = 0, magiix = 1 |
| Offset | [4–6] | Real Offset = Offset div $2^4$ |
| Tab0 | [8–13] | Temperature error @ 32 C. |
| Tab1 | [14, 15, 17–20] | Temperature error @ 34 C. |
| Tab2 | [21–24, 26–28] | Temperature error @ 36 C. |
| Tab3 | [28–33] | Temperature error @ 38 C. |
| Tab4 | [35–40] | Temperature error @ 40 C. |
| Tab5 | [41, 42, 44–47] | Temperature error @ 42 C. |

TABLE 2-continued

| Constant | Bit [msb to lsb] | Note: |
|---|---|---|
| Tab6 | [48–51, 53, 54] | Temperature error @ 44 C. |
| Tab7 | [55–60] | Temperature error @ 46 C. |
| TB0 | [62–69, 210–212] | Temperature slope constant |
| TB | [213–217, 219–224] | Temperature slope constant |
| Nt | [225–226], [228–235], [237–240] | 14-bit temperature register data; msb to lsb |

The following pseudo code is illustrative of the process for converting data format conforming to preferred embodiments of the invention to a temperature measurement. First, define the constants in the reader:

```
TT_SCALE=8
TT_TABLE_SIZE=8
TT_K_MIN=1
TT_K_MAX=6
TT_START_SCALED=8192
TT_STEP_SHIFT=1
TT_STEP=2
TT_STEP_SHIFT_SCALED=9
TT_B0_OFFSET=-3200
TT_B0_SHIFT=0
TT_B_OFFSET=-500
TT_B_SHIFT=2
TT_NT_SHIFT=0
TT_ERR_SHIFT=4
```

Next, calculate the calibrated temperature "ct" as shown below with the data collected from the data acquisition device 110:

```
temp=bitshift(nt,TT_B_SHIFT+TT_B0_SHIFT+TT_NT_SHIFT);
temp=temp/(b0+TT_B0_OFFSET);
temp=temp*(b+TT_B_OFFSET);
temp=bitshift((b+TT_B OFFSET),TT_B_SHIFT)-temp;
k=bitshift(((temp-TT_START_SCALED+bitshift(1,(TT_STEP_SHIFT_SCALED-1))),-TT_STEP_SHIFT_SCALED);
k=(k<TT_K_MIN?TT_K_MIN:k);
k=(k>TT_K_MAX?TT_K_MAX:k);
d=temp-TT_START_SCALED-bitshift(k,TT_STEP_SHIFT_SCALED);
e=bitshift(tt[k+1]+tt[k-1]-bitshift(tt[k],1),TT_ERR_SHIFT);
e=e*d;
e=bitshift(e,-TT_STEP_SHIFT_SCALED);
e=e+bitshift(tt[k+1]-tt[k-1],TT_ERR_SHIFT);
e=e*d;
e32 bitshift(e,-(TT_STEP_SHIFT_SCALED+1));
e=e+bitshift(tt[k],TT_ERR_SHIFT);
c_temp=temp+e-((B_CAL_ADJ/(2^3))*(2^TT_SCALE));
ct=c_temp/(2^ATT_SCALE);
```

Where "temp" is a long integer that holds the scaled and shifted value of "nt" that is then used to calculate scaled temperature of the bolus. Where "nt" is 16383 −NT; where NT is the 14 bit value collected from the chip. Where "b0"=TB0 from the memory map. Where "b"=TB from the memory map. Where "K" is an integer pointer to the tt[0:7] temperature error table seen as Tab[0:7] in the memory map. Where "d" and "e" are integer values that are the calculated error factors. And where "ct" is the final temperature. The transmitted value of temperature should be transmitted rounded to two decimal places. The code above was written in Agilent VEE.

Data acquisition devices of the present invention, because they incorporate transponders that meet the '784 standard for ID code and order of bits for the ID telegram header, ID code, error detection code, trailer, and control bits, are operable with regular ISO-compliant transceivers. An ISO-compliant transceiver will ignore the leading 81 bits and the trailing 47 bits and read the ID telegram as though it were from a tardy, but ISO-compliant transponder. In some embodiments, transceivers of the present invention that incorporate ISO-compliant receivers are operable with regular ISO-compliant transponders.

Figure 4:
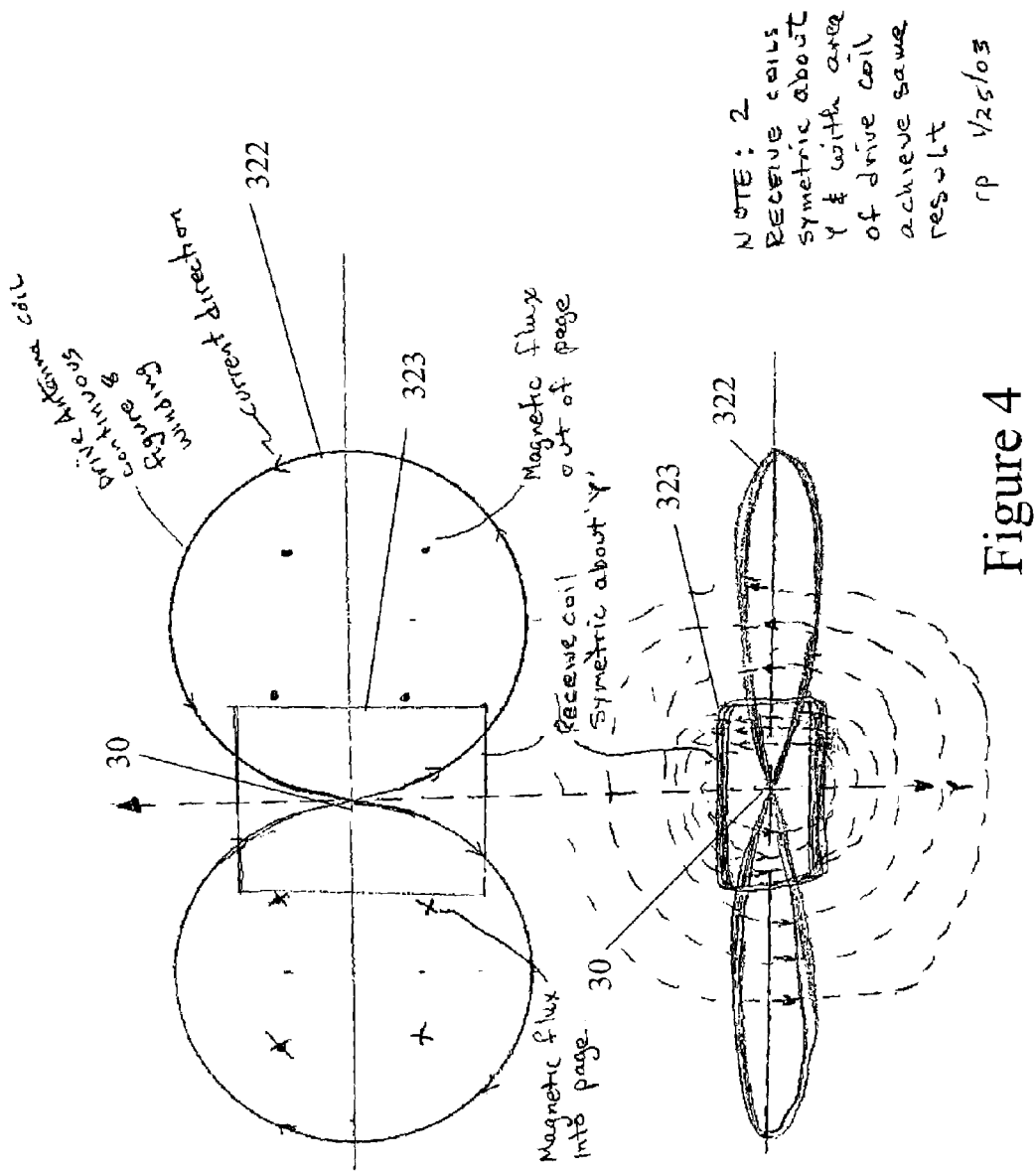
FIG. 4 illustrates the geometric and electromagnetic field relationship between activation and receive antennas of preferred embodiments of the invention.

Referring to FIG. 4, a preferred configuration of the antennas of the present invention is shown. In preferred embodiments, the activation antenna 322 is configured as a figure-eight such that the flux generated by each side of the figure-eight is substantially equal, but in substantially opposite direction. The receive antenna 323 is deployed about a common axis of symmetry 30 with the activation antenna 322. By deploying the receive antenna 323 about a common axis of symmetry 30 with the activation antenna 322, the receive antenna encompasses substantially equal and opposite amounts of flux, reducing the magnitude of the electrical signals induced into the receive antenna 323 from the activation energy over known configurations. This enables the use of larger activation fields, translating to larger read zones and allowing transponders equipped with more versatile sensors (typically requiring stronger activation fields), without compromising the ability to receive the data acquisition device transmissions or else requiring more sophisticated transceiver electronics to separate data acquisition device transmissions from the electrical signals induced from the activation energy. In preferred embodiments, the activation antenna is deployed in two substantially circular loops. In some embodiments, the diameter of each substantially circular loop is 24". Loop diameter is approximately equal to the read range, e.g., the distance across the read zone measured perpendicularly from the plane of the antenna. In preferred embodiments, the activation antenna 322 is formed from six turns of 120 strands at 41 AWG Litz wire.

Figure 5:
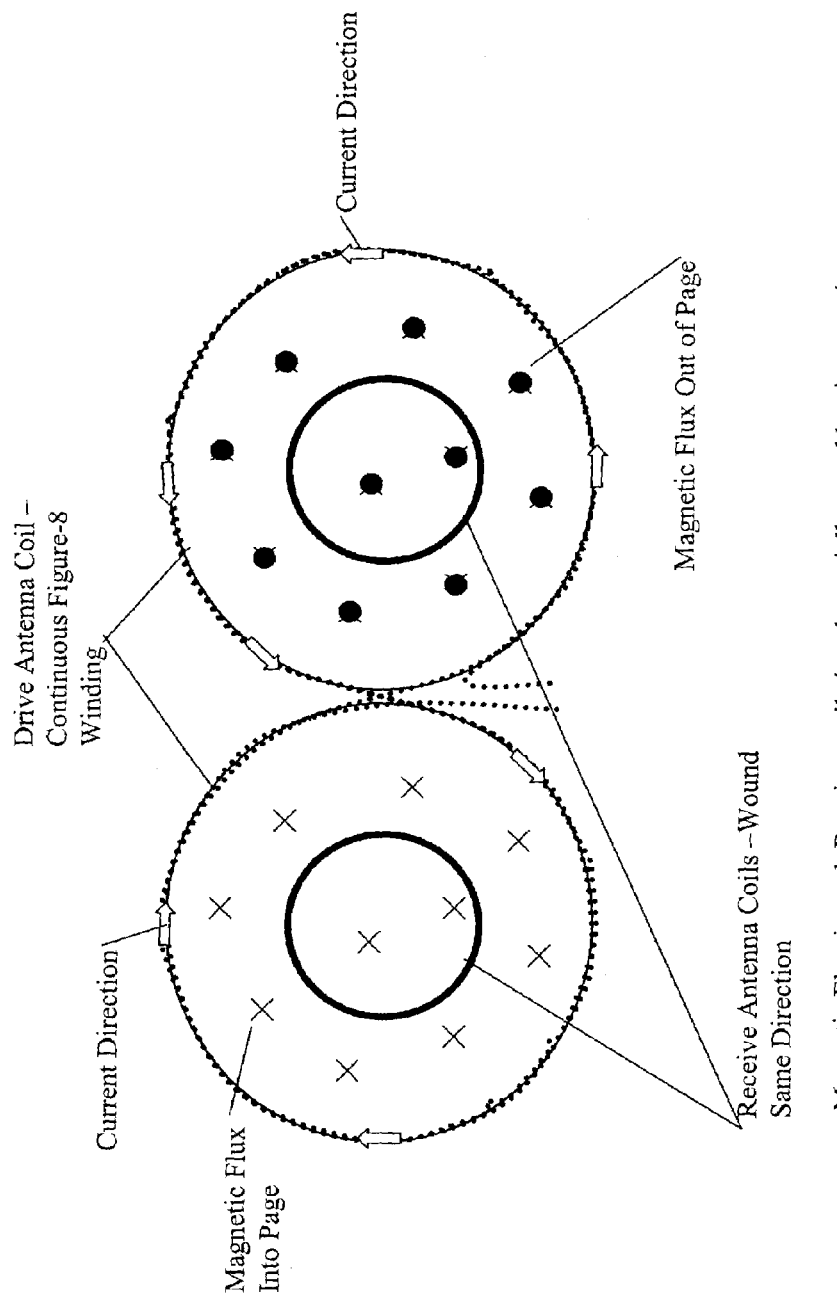
FIG. 5 further illustrates the geometric and electromagnetic field relationship between activation and receive antennas of preferred embodiments of the invention.

FIG. 5 illustrates a two-coil receive antenna of preferred embodiments of the present invention. Two substantially equal-sized receive antennas, spaced about a common axis of symmetry with the activation antenna coils and some distance away (z-axis) from the plane formed by the activation coil, will substantially cancel the flux from the activation antenna. Also in preferred embodiments, the receive antenna 323 is formed of 30 turns of 28 AWG solid core enamel coated magnet wire.

Preferred embodiments of the system 100 have a standby mode. In preferred embodiments, the system 100 moves out of standby mode, to active mode, when the proximity sensor 141 is triggered, desirably by the approach of an animal 10 from which data will be acquired and collected. The system 100 remains active for a period. In preferred embodiments, this period is set to timeout in two minutes when triggered by the proximity detector 141. The timeout period is reset if the system is re-triggered, either via the proximity detector 141, or manually, within the current timeout period. When a data acquisition device 110 has been successfully read, the system 100 can provided an indication, e.g. an audible noise, a visual indication, and display both the bolus ID and the measured temperature on the user interface 133. When one or more animals are present, the system will remain active, then turn inactive after the set period has expired after the last triggering of the proximity detector 141. In automatic mode, ID code and temperature are read as each animal 10 with a data acquisition device 110 passes through the read zone 20, e.g., preferably one at a time via a chute.

Embodiments of the system also are operable in manual mode by, inter alia, initiating a manual read via the user interface 133. A data acquisition device 110 in the read zone 20 can be read for a period after initiating a manual read. In preferred embodiments, the manual read period is ten seconds. In other embodiments, the manual read period, as all periods described herein, can be selected. Manual read may be selected even during automatic operation.

Each time a data acquisition device 110 is read, the system stores the ID, bolus temperature, along with date and time of the reading. This data can be downloaded to a separate computer, via communications ports 134.

Preferred embodiments of the system have at least two read modes, i.e., continuous ID and unique ID. Depending on the speed of the animal 10 passing through the read zone 20, a data acquisition device 110 may be read more than once. In unique ID read mode, only one reading from consecutive identical IDs is stored in memory, e.g., multiple readings from the same slow-moving animal are ignored. In continuous ID read mode, all readings are stored. Some embodiments of the system store 24,951 readings before overwriting the entries. Given that, unique ID read mode may be used to efficiently employ available memory in order to lengthen the time between downloads from the system.

Figure 6:
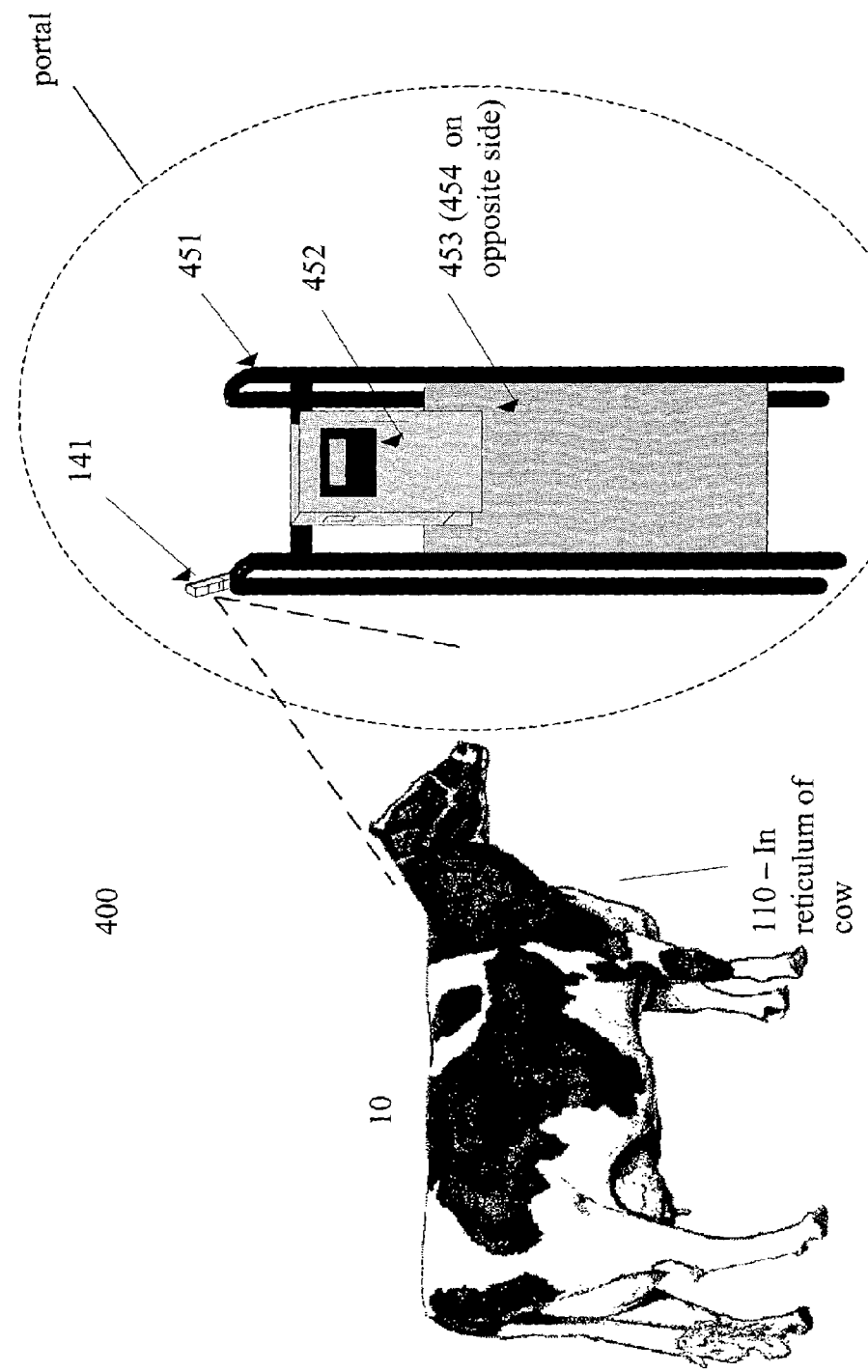
FIG. 6 illustrates a schematic representation of a system of the present invention.

Referring to FIG. 6, an exemplary system in accordance with the present invention is shown. A system 400 of the invention includes a portal frame 451, an electronics enclosure 452, a portal first side 453, a portal second side 454, and a proximity sensor 141. The system 400 further includes a data acquisition device 110, a transceiver 120, and a control and analysis subsystem 130. In the illustrated embodiment, the electronics enclosure 452 houses the transceiver electronics 121 and the control and analysis subsystem 130. An activation antenna 122 and receive antenna 123 are housed in different sides 453, 454 of the portal. In this embodiment, each of the foregoing elements with the exception of the data acquisition device 110 is collectively referred to as the "portal."

In preferred embodiments, the data acquisition device 110 is an RFID transponder 112a with one or more sensors 112b and is configured as an ingestible bolus as described above. In an exemplary embodiment, the ingestible bolus includes a temperature sensor 112b. However, systems of the invention can accommodate other data acquisition devices, passive or active; ingestible or non-ingestible. When an active data acquisition device is used, the activation antenna is unneeded and the radio frequency equipment (a transceiver 120 in the embodiments described above) can be replaced by a receiver.

Continuing to refer to FIG. 6, the portal frame 451 is configured as a powder-coated welded steel tube frame, with mounting tabs (not shown) for portal sides 453, 454. Those skilled in the art will recognize other means for mounting the portal sides to the portal frame e.g., fasteners through mounting holes integrated in the portal sides and portal frame. In some embodiments of the invention, a separate portal frame 451 is not used and the portal sides 453, 454 containing antennas 122, 123 are mounted to any convenient existing structure. For cattle, the frame 451 is typically 34" wide×36" long×78" high. The frame 451 can be stabilized by being attached to existing fence panels, bolting it to a floor, or staking it to the ground.

Figure 7:
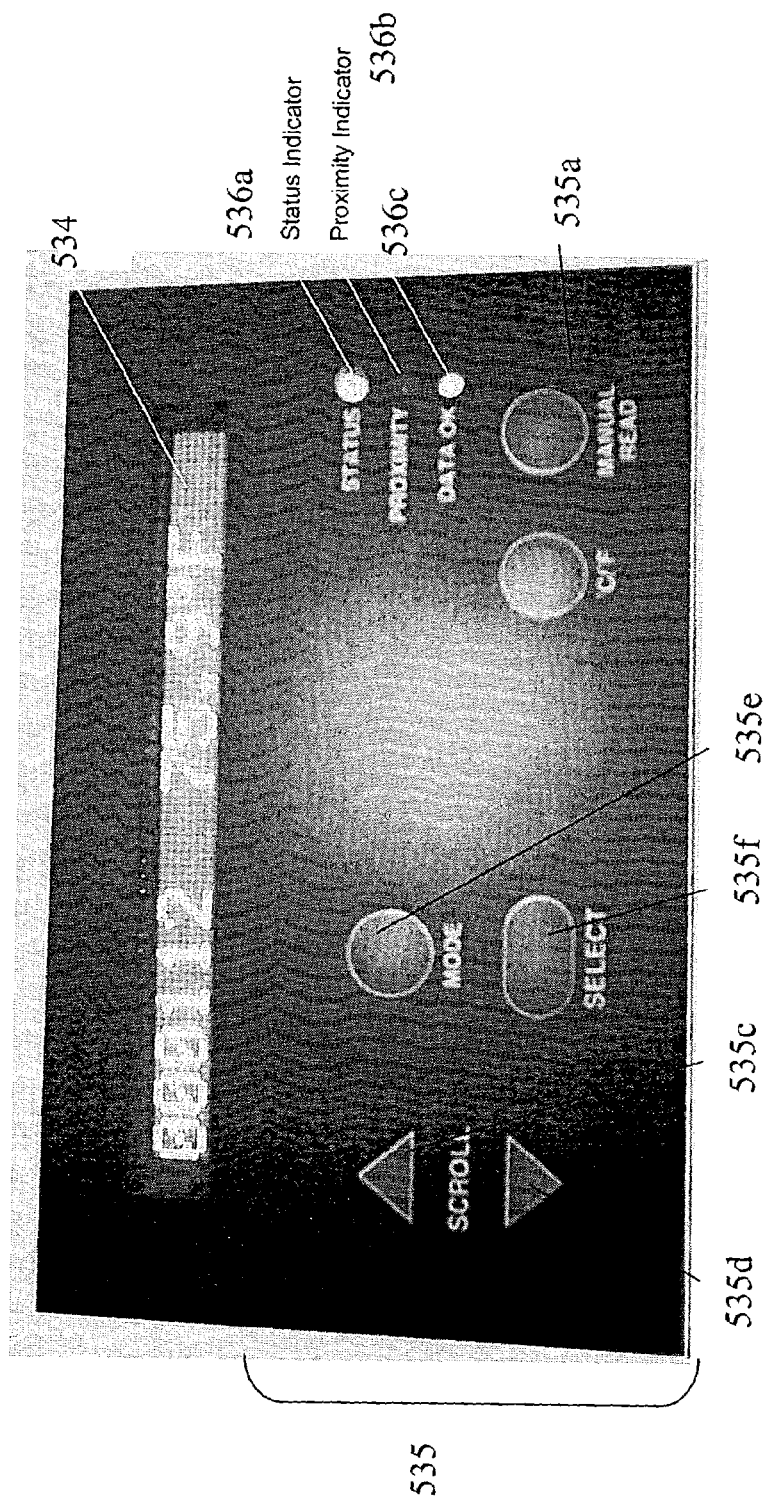
FIG. 7 illustrates a user interface of the present invention.
Figure 8:
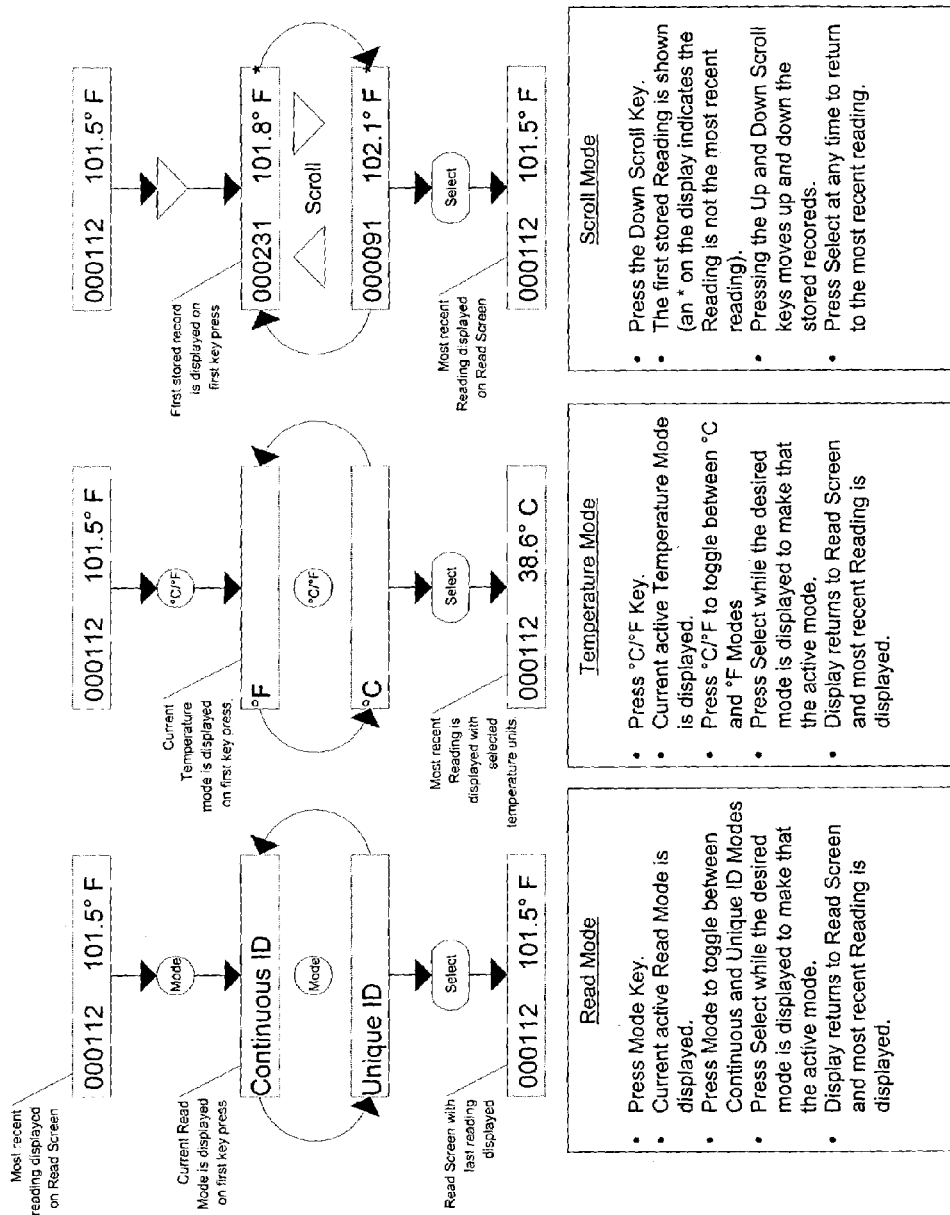
FIG. 8 is a control and analysis flowchart of the present invention.

The enclosure 452 is compliant with the National Electrical Manufacturers Association-4 (NEMA-4) standards. The enclosure provides a user interface 133 as illustrated in FIG. 7, including a display 534, keypad 535, and indicators 536. A user may select the mode of operation by toggling through modes using the "mode" key 535e and then depressing the "select" key 535f. During operation, the display 534 will show data for the selected mode, e.g., ID and temperature (as illustrated), or ID and time. Various lines of data can be viewed by using the "scroll" keys 535c, 535d. The user interface 133 provides indicators 536 for overall system status 536a (red, green, or yellow), proximity indicator 536b, and data integrity 536c. The keypad 535 allows manual triggering of system via the "manual read" key 535a. Table 3 further describes commands and indicators available via the user interface 133 shown in FIG. 7. FIG. 8 illustrates navigation through various display modes of preferred embodiments of the invention.

TABLE 3

Sample User Interface Functions and Panel Indicators.

|  | Function | Comments |
| --- | --- | --- |
| Key |  |  |
| Manual Read | Triggers a manual reading | Transceiver is active for 10 seconds |
| ° C./° F. | Recalls current temperature units setting and used to switch between degrees Celsius and Fahrenheit | Data are stored in degrees C. |
| Mode | Recalls Current Read Mode and used to switch between Continuous and Unique Read Modes |  |
| Select | Used to select new Read or Temperature Mode and to return to current reading screen |  |
| Scroll Up/Down | Used to review all previous readings |  |
| Panel Indicators |  |  |
| Status | Indicates system is on and all components are operating correctly |  |
| Proximity | Indicates the proximity sensor has detected an animal | Indicator is on when the system is on (from proximity or manual trigger) |
| Data OK | Indicates valid data has been received |  |

Figure 9:
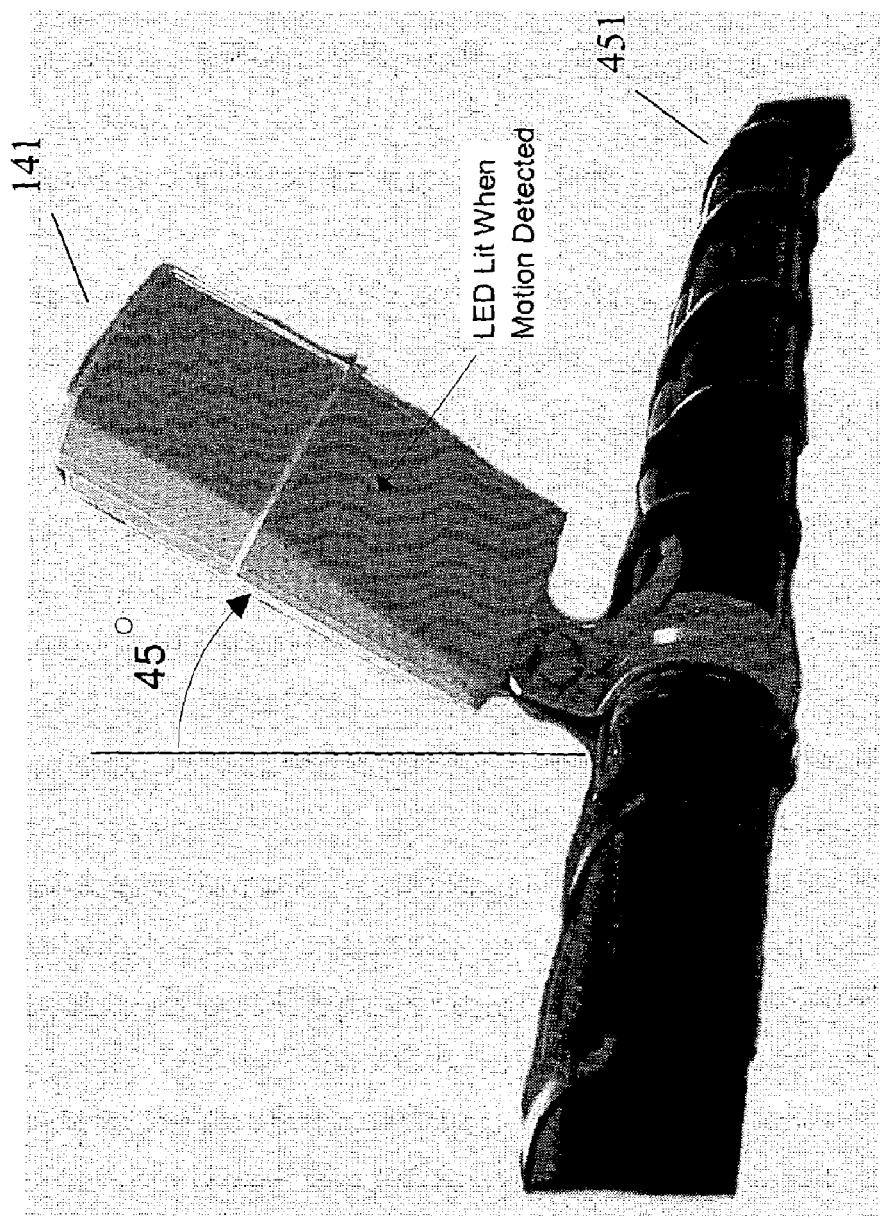
FIG. 9 illustrates the relationship between a proximity detector and a portal frame of the present invention.

In some preferred embodiments, the proximity detector 141 is a passive IR sensor attached to the portal frame 451. The proximity detector 141 provides a visual indication (above, such indication is on the user interface 133) when it is triggered. Preferably, the proximity detector 141 is aimed toward the direction from which animals 10 enter the read zone 20, e.g., 45° from vertical, approximately as shown in FIG. 9. Preferably, the proximity detector 150 senses an approaching animal approximately three feet before the animal's head reaches the read zone 20.

The transceiver electronics 121 do not have to be on the portal frame 451, but are preferably on the portal frame 451 so that the portal is one integrated unit. This also applies to the activation antenna 122 and receive antenna 123. Mounting these components on a portal frame 451 makes deployment and storage of the system more adaptable than if the components were separately supported. Although it is within embodiments of the present invention to mount these elements separately.

Figure 10:
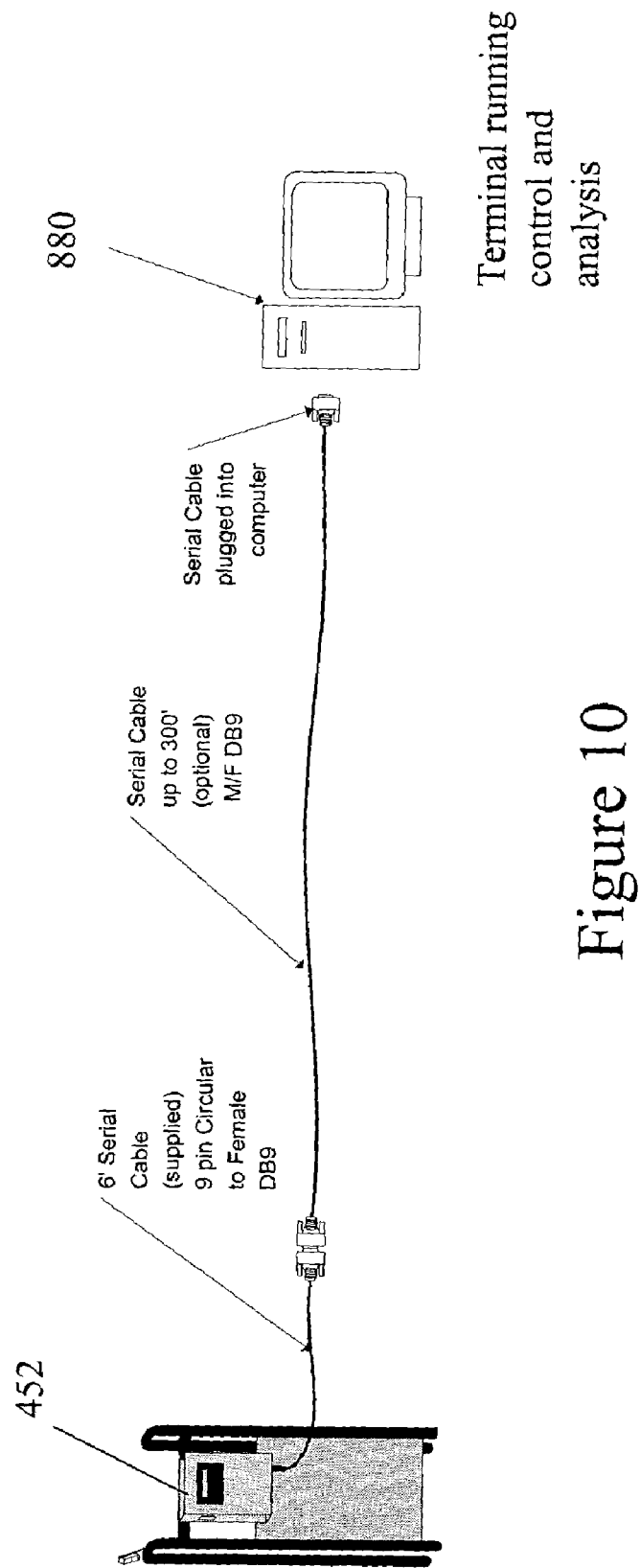
FIG. 10 is a schematic representation of RS-232 communication between a system of the present invention and an external device.
Figure 11:
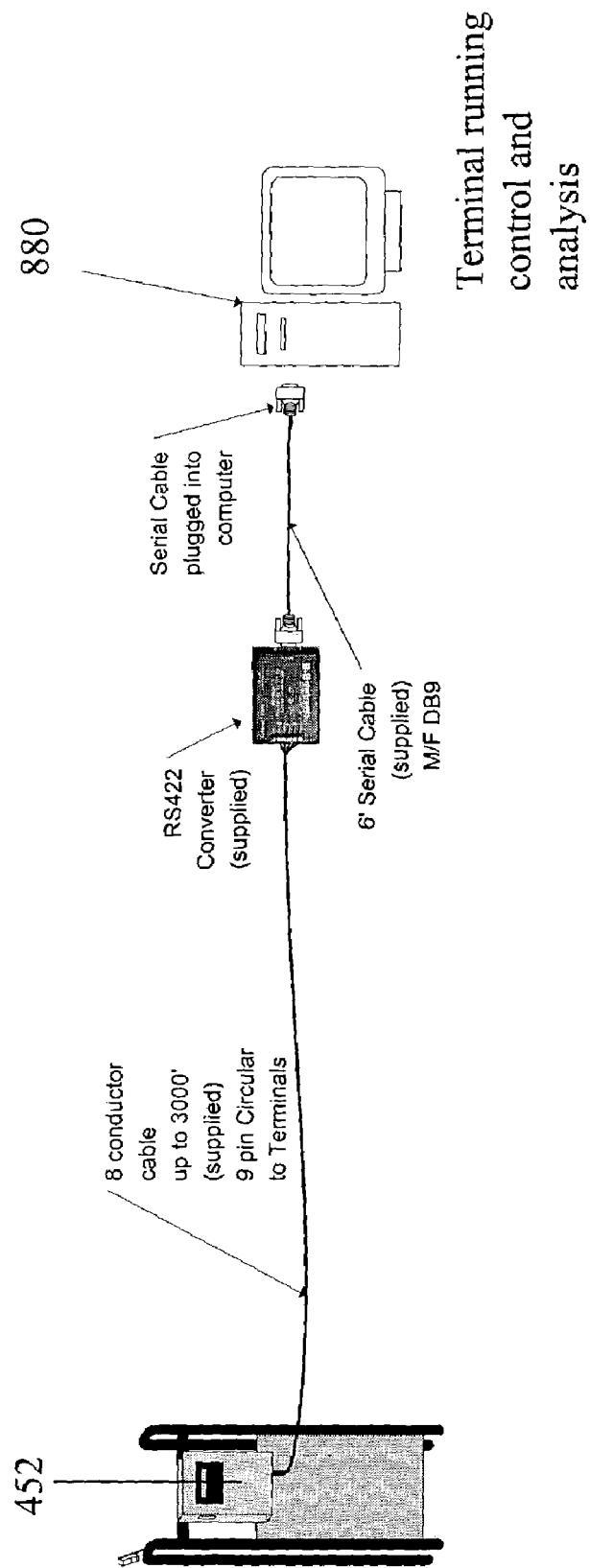
FIG. 11 is a schematic representation of RS-422 communications between a system of the present invention and an external device.

Referring to FIG. 10 and FIG. 11, the exemplary embodiments illustrated in FIG. 6 can be remotely controlled via communication ports 134, e.g., RS-232 641 or RS-422 741, using an external device 880, e.g., a computer running interface software. Controls can be issued via the external device 880 and data may be collected from the system via the external device 880 in either continuous or batch remote data collection modes.

In each remote data collection mode, a computer program product of the present invention is operative on an external device 880. The external device 880 is in communication with the system via one of the interrogator data ports, e.g., RS-232 641, RS-422 741 in a fashion known to those skilled in the art. FIG. 10 and FIG. 11 illustrate example RS-232 and RS-422 interconnections respectively.

In continuous remote data collection mode, data is collected from the system in real time, e.g., each reading is sent to the external device 880 as the reading is taken. In batch remote data collection mode, a user may issue commands via the external device 880 for data collection and for control of the system. Available commands include those in Table 4. The data downloaded from the system is formatted as described above for preferred embodiments. This format is compatible with typical spreadsheet and database data import formats. Other data formats compatible with existing and-future software applications are or will be apparent to those skilled in the art.

TABLE 4

Sample Commands Available Via Data Ports.

| Command | Result |
| --- | --- |
| L | Downloads the entire contents of system memory (up to 24,951 readings). Data are displayed on the screen and NOT saved on the PC. Data remain in system memory. |
| l–n# | Downloads # readings and displays them. Readings are NOT saved on the PC. |
| l–f filename | Downloads the entire contents of the system memory and saves them to the file named 'filename'. |
| l–n# -f filename | Downloads the last # readings and saves them to the file named 'filename'. |

The overall system is water-resistant and can be powered from single-phase commercially available alternating current power or direct current power.

The system will nominally operate in an automatic mode. However, there are some functions and settings that a user can control via the keypad 535 illustrated in FIG. 7. In some embodiments the system is controllable via the non-keypad interfaces, e.g., RS-232, RS-422, IR port. Table 5 identifies the control available via the keypad 535. Each keypad function is also available via non-keypad interfaces.

Figure 12:
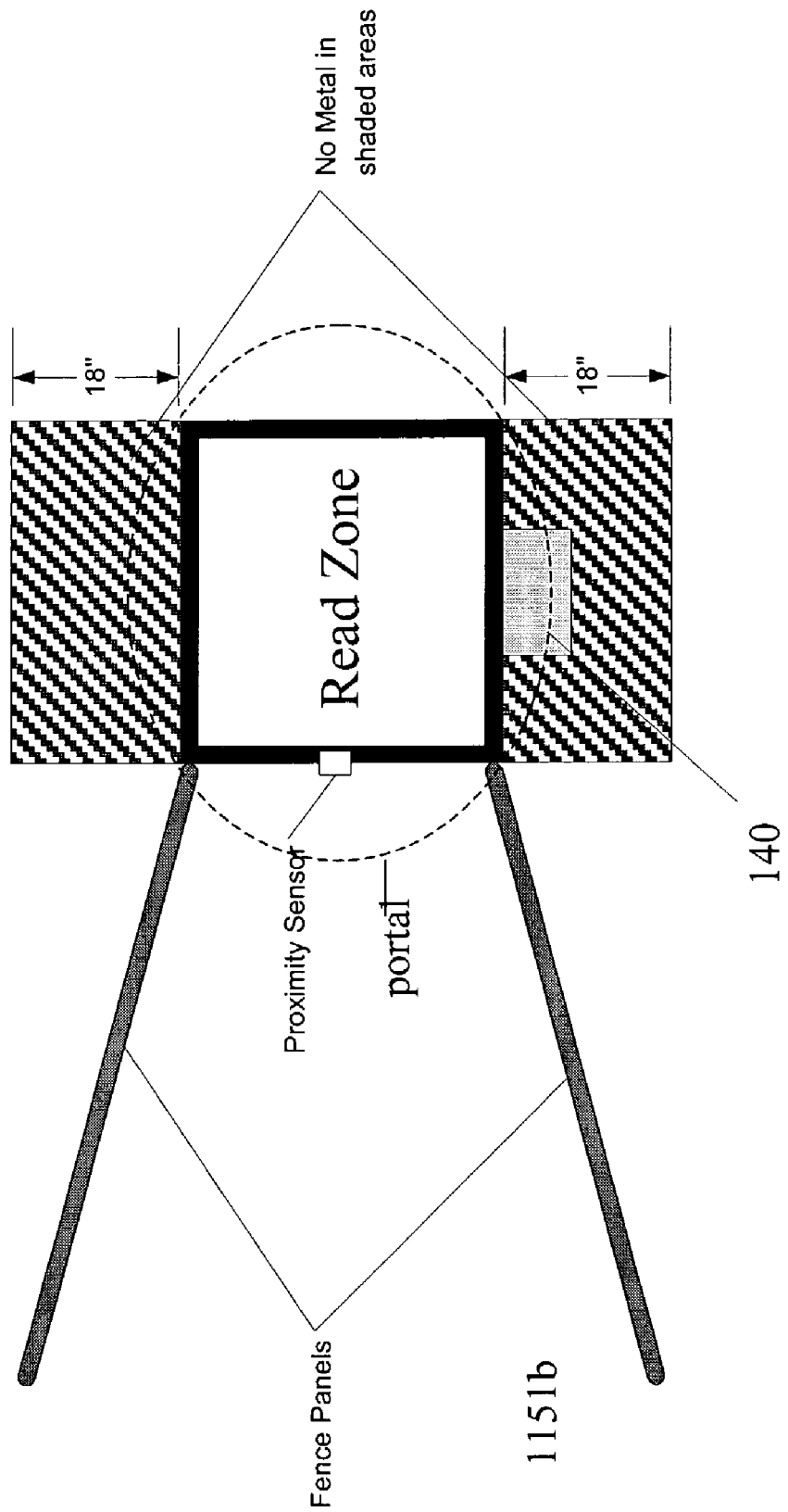
FIG. 12 is a schematic of deployment of a system of the invention.

Referring to FIG. 12, a deployment of an embodiment of the system as described above is shown. As illustrated in FIG. 12, the portal should be placed such that the antennas 122, 123 are not in close lateral proximity, e.g., not within 18 inches laterally, of large metallic objects or fence panels. Fence panels may be attached to the edges of the portal as shown in FIG. 12.

Figure 13:
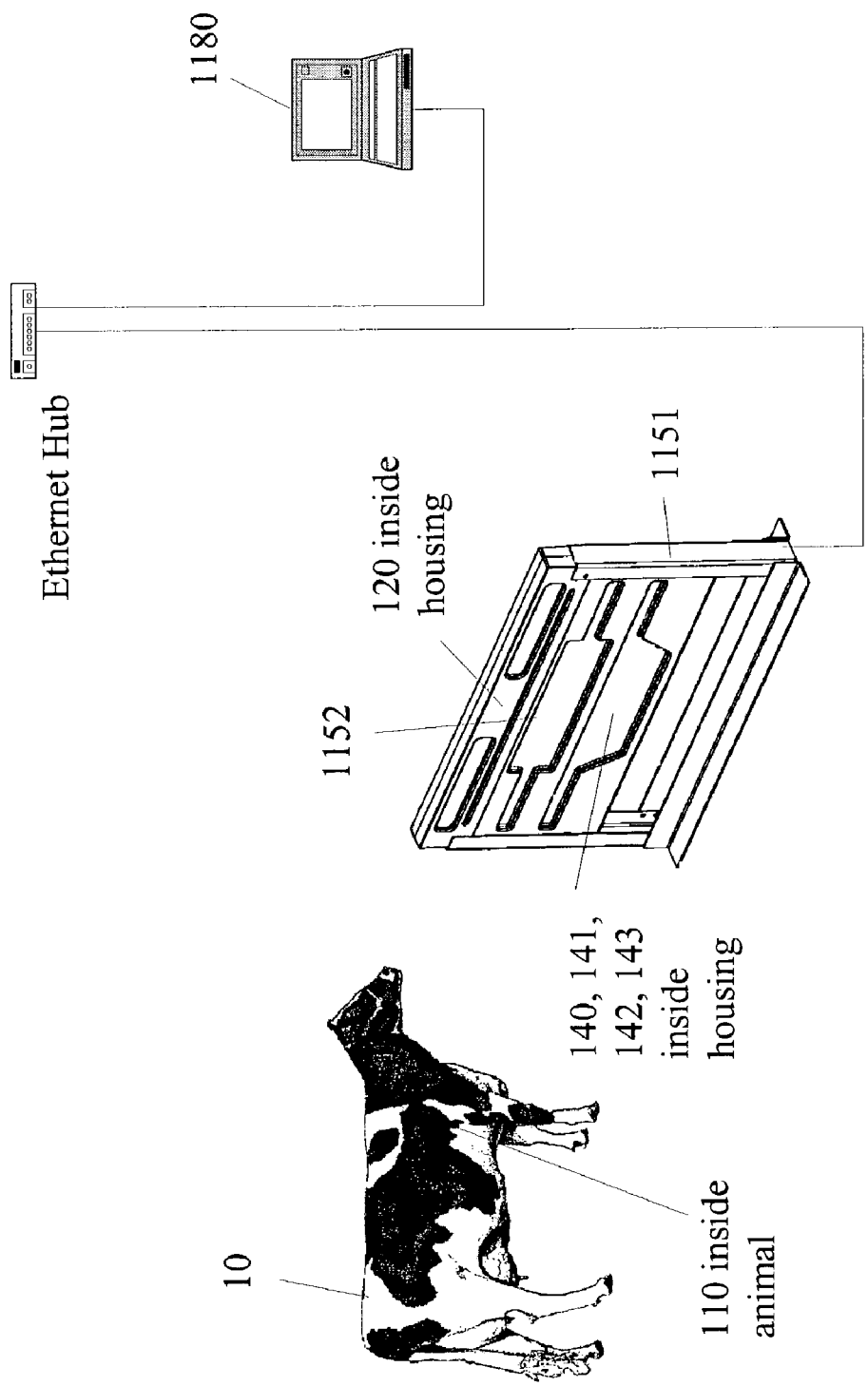
FIG. 13 illustrates a schematic representation of a system of the present invention.

Referring to FIG. 13 an alternative embodiment of a system of the present invention is shown. A system 1100 of the invention includes housing comprising a panel frame 1151, a panel body 1152, a panel cap 1153, and panel insert 1154. The system 1100 also includes a data acquisition device 110; a transceiver 120; peripheral sensors including two proximity sensors 141, an ambient temperature sensor 143, and a humidity sensor 142; and a control and analysis subsystem 130 deployed at a remote processor 1180.

Figure 14:
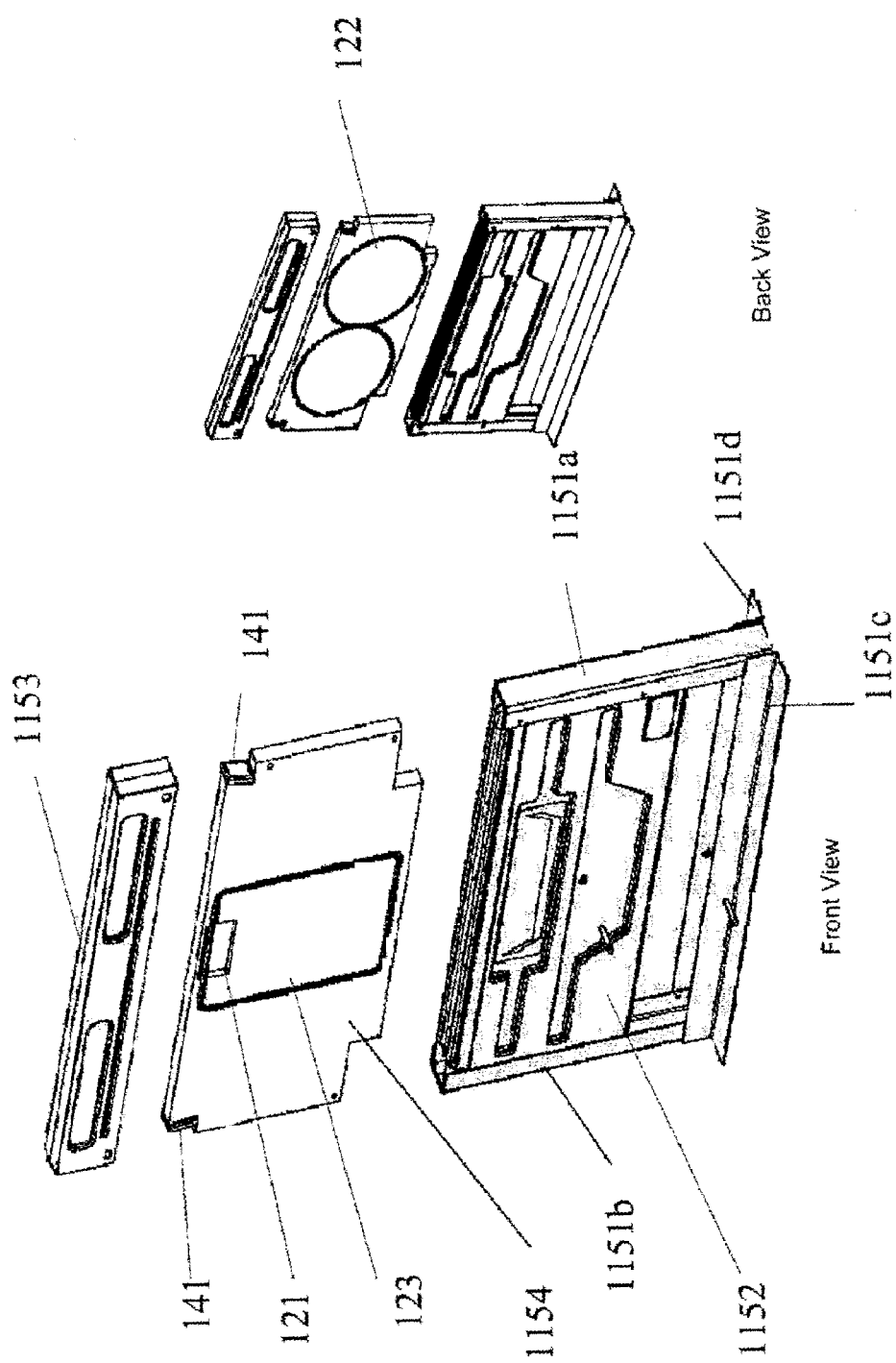
FIG. 14 illustrates a schematic representation of a detail of a system of the present invention.
Figure 15:
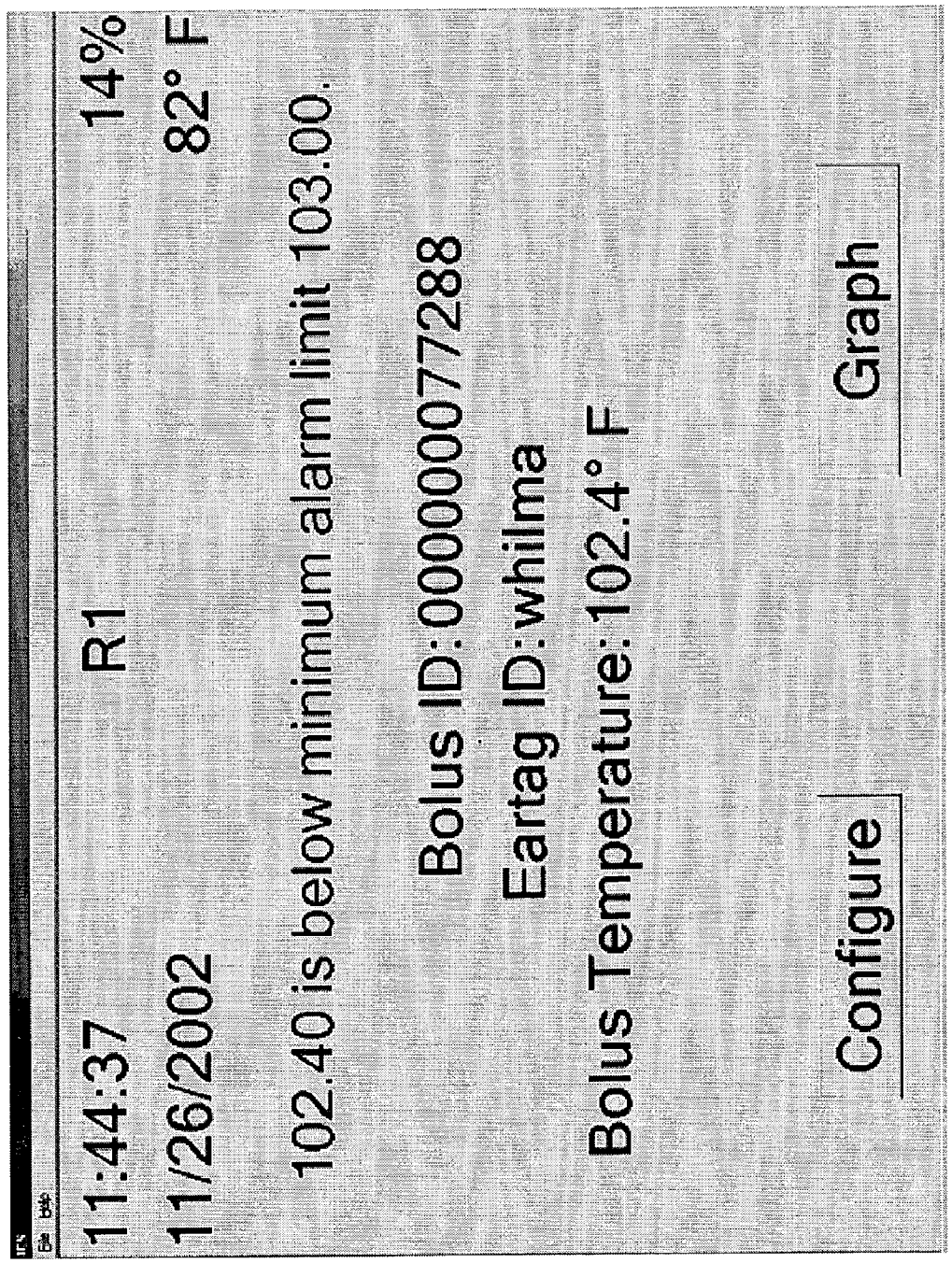
FIG. 15 illustrates a touch panel control window of the present invention.

As shown in FIG. 14, the panel frame comprises a pair of channel-shaped vertical members 1151a, 1151b, along with two L-shaped horizontal base members 1152c, 1151d. The panel body 1152 fits inside the channels formed by the vertical members 1151a, 1151b. Means of securing the panel body 1152 within the panel frame 1151 will be apparent to those skilled in the art. The panel insert 1154 carries the transceiver 120 including the transceiver electronics 121 along with the receive antenna 123 and activation antenna 122 on opposite sides of the panel insert 1154. The transceiver 120 is preferably powered from 24 VDC nominal. Note that the receive antenna 123 and activation antenna 122 are deployed symmetrically about a common axis. In addition, the panel insert 1154 also carries the peripheral sensors 140; the proximity sensors 141 are shown on opposite ends of the panel insert 1154. In the current embodiment, the proximity sensors 141 are microwave. One proximity sensor 141 is placed on each side of the panel insert to detect subject animals 10 from each lateral direction. The humidity sensor and ambient temperature sensor are not shown, but can be placed at advantageous locations on or near the panel, e.g., integrated with the transceiver electronics, placed to increase exposure to ambient conditions. The panel insert 1154 is seated within the panel body 1152 and secured by means apparent to those skilled in the art. The panel cap 1153 secures and protects the panel insert from vertical movement and hazard.

The functional relationship between elements of this embodiment of the system 1100 is as described in conjunction with FIG. 1 with the following exceptions. In this embodiment, the control and analysis subsystem utilizes the processing resources, memory, and communications ports of a remote processor, e.g., a personal computer. The computer program product 135 is hosted by and executes on this platform 1180. The user interface 133 is primarily via the display, keyboard, and pointing device of the remote processor 1180. FIG. 14 illustrates a portion, i.e., a control window 1300, of the user interface 133. In preferred embodiments, the control window 1300 and other elements of the user interface are implemented as a touch screen. In other embodiments, the computer program product is distributed over other networked platforms, or complimented by ancillary user interface functionality at other platforms. In preferred embodiments, data acquired and collected from livestock is also made available: in graph form over time; as aggregate and statistical information; and in various graphic forms, e.g., pie charts, bar charts, etc., among others.

Figure 16:
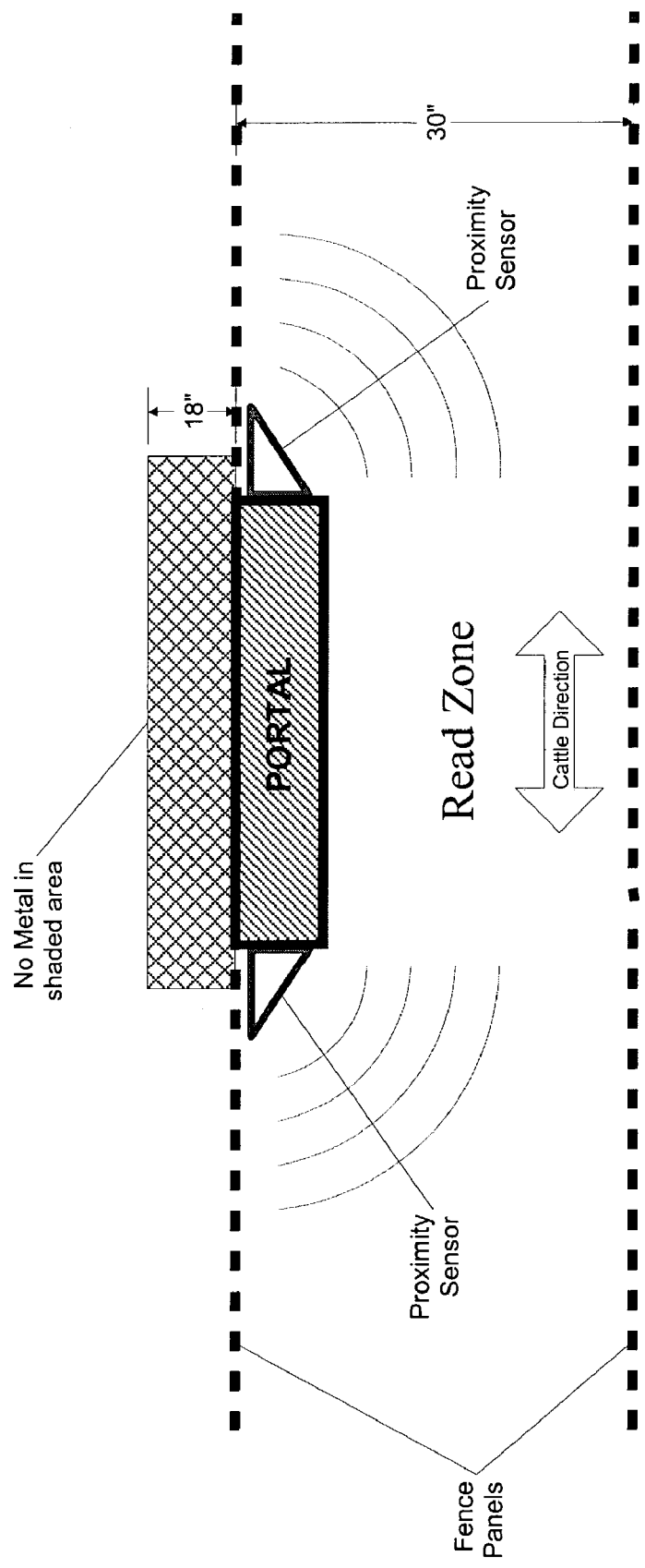
FIG. 16 is a schematic of deployment of a system of the invention.

Referring to FIG. 16 a schematic diagram of deployment of a system of the alternative embodiment is shown. As illustrated in FIG. 16, the portal should be placed such that the panel is not in close lateral proximity, e.g., not within 18 inches laterally, of large metallic objects or fence panels. Fence panels may be attached to the edges of the portal as shown in FIG. 16.

In a method of the invention for making a ferrite/PCB assembly a PCB is soldered to the tinned leads of a ferrite coil using lead-free solder. The ferrite/PCB assembly is conformally coated and UV cured for mechanical strength and electrostatic discharge (ESD) protection.

Another method of the invention includes steps for assembling a bolus. In a preferred embodiment of that method, in a tray accommodating one or more boluses tubes, the tray having a magnet at the bottom of each bolus receptacle, place a bolus tube in each receptacle, seating each bolus tube bottom against a magnet. Using a calibrated depth gauge, fill each bolus tube with resin to the gauge height, typically 7 cc of resin. Insert the ferrite/PCB assembly (PCB first) into the resin, press the ferrite PCB assembly to the bottom, and center it. The resin should be level with the top of the ferrite. The assembly tray magnet should stabilize the ferrite PCB assembly and help hold it in place. Place a card spacer and a felt spacer (in that order), or a cork spacer only, into the bolus and press down so that the spacers rest on top of the ferrite. Spacers between parts of the bolus may be selectively omitted based on quality assurance history of test boluses without spacers. Add a measured amount of ballast to the bolus. Using a mixing gun, place the mixing gun nozzle tip to the bottom of the ballast and fill the tube with approximately 2.5 cc of resin. The resin should reach the top of the ballast. Place a card spacer on top of the ballast. Using a loaded magnet inserter, pressing down against the card spacer, drop a magnet into the inserter so that the magnet rests on the card spacer. Using a nonmagnetic plunger hold the magnet in place while removing the magnet inserter. Fill the area around the magnet with resin to the level of the magnet, typically 1.5 cc. Assembled bolus is cured at 60° C. for two hours. A top spacer is put on top of bolus. Cap is ultrasonically welded in place, see FIG. 2. The top spacer is used to mitigate the chance that the welding does not damage the cap.

Yet another method of the present invention is one for livestock data acquisition and collection. In that method, the following steps are executed in no particular order. Provide a physically stable, electrically powered transceiver in an area where livestock will move or through which livestock can be herded one at a time. Note that "herded" includes all known methods for moving livestock including, but not limited to: luring, enticing, baiting, chasing, conveying, and otherwise influencing the position of livestock. For stability, the transceiver can be attached to existing fence panels, bolted to a floor, or staked to the ground. For example, at least two configurations for supporting transceivers are described herein. It may be necessary to neck down an alley or chute to accommodate having only one animal at a time trigger the proximity detector and enter the read zone.

Preferably an ISO & FDA-compliant bolus in accordance with preferred embodiments of the present invention is intended for placement in the reticulum of the animal using a balling gun. The weight of the bolus is such that it will likely remain in the reticulum of the animal during its life. Place a bolus in each animal from which data will be acquired and collected (or attached the RFID device with sensor to the animal as appropriate for, inter alia, proper sensor operation). An effort should be made to prevent the animal from biting the bolus during insertion. After insertion, the animal should be monitored for approximately one hour to detect if the bolus is regurgitated. Interrogation of the bolus may produce no data, or unreliable data, until the bolus settles into the animal's reticulum. Typically, this occurs within the one day.

At least once after initial setup of the system, and thereafter as necessary, correct operation of the system should be verified. Next, while positioning a bolus in the read zone initiate a manual read. In preferred embodiments, an indication of valid read will be made and the system will display the bolus ID and temperature. Preferred embodiments of the invention include a troubleshooting guide if the invention does not operate as expected during verification or other operation.

After doing the above, the following in order: As the animal approaches the read zone from the proper direction (for automatic mode this is the side of the read zone where the proximity detector is mounted) the proximity detector detects the animal and triggers the transceiver from standby mode to active mode. An animal may be herded to approach the read zone, or an animal may be lured to the read zone, or may wander to the read zone of its own accord, e.g., as in feeding. As the detected animal passes through the read zone, the transceiver transmits electromagnetic energy thru the activation antenna. The bolus is thus energized. Note that with the system in the manual mode, or the use of multiple proximity detectors, the animal may approach from either side of the read zone. The energized bolus transponds modulated electromagnetic energy.

The transceiver receives the bolus transmission via the receive antenna. The transceiver demodulates the information in the received bolus transmission and logs the information, with a time stamp. In addition to logging, the time-stamped information is displayed on the user interface and is made available at other communications ports, e.g., RS-232, RS-422 147.

The invention claimed is:

1. A system for acquiring data from a subject animal, the system comprising:
    at least one passive data acquisition device associable with a subject animal, the at least one device comprising:
        at least one sensor operable to provide sensor data relating to the subject animal;
        a radio frequency identification (RFID) transponder operable to transmit an RFID telegram comprising the sensor data, wherein the RFID telegram comprises:
            an ISO 11785-formatted full duplex identification telegram, the sensor data outside the ISO 11785-formatted full duplex identification telegram; and
            wherein a first portion of the ISO 11785-formatted full duplex telegram is contained in a portion of the RFID telegram intended for transmit during an initial ISO 11785 activation period, and a second portion of the ISO 11785-formatted full duplex telegram is contained in a portion of the RFID telegram intended for transmit during an extended ISO 11785 activation period; and
        at least one magnet separate from the transponder; and
    a transceiver,
        the transceiver operable:
            to activate the at least one passive data acquisition device, and
            to receive and demodulate the REID telegram from the data acquisition device sent in response to the activation;
        the transceiver comprising:
            an activation antenna configured to encompass areas of substantially equal and substantially opposite flux; and
            a receive antenna configured symmetrically along an axis of symmetry of the activation antenna.

2. A data acquisition device associable with a subject animal, the device comprising:
    a sensor operable to provide sensor data relating to a subject animal, and
    a radio frequency identification (RFID) transponder operable to transmit an RFID telegram comprising the sensor data; and
    wherein the RFID telegram comprises:
        an ISO 11785-formatted full duplex identification telegram, and
        the sensor data outside the ISO 11785-formatted full duplex identification telegram; and
    wherein:
        a first portion of the ISO 11785-formatted full duplex telegram is contained in a portion of the RFID telegram intended for transmit during an initial ISO 11785 activation period, and
        a second portion of the ISO 11785-formatted full duplex telegram is contained in a portion of the RFID telegram intended for transmit during an extended ISO 11785 activation period.

3. Radio frequency equipment comprising:
    a receiver operable to receive and demodulate a radio frequency identification (RFID) telegram from a data acquisition device associable with a subject animal, wherein the RFID telegram comprises:
        an ISO 11785-formatted full duplex identification telegram, and
        the sensor data outside the ISO 11785-formatted full duplex identification telegram;
            a first portion of the ISO 11785-formatted full duplex telegram is contained in a portion of the RFID telegram intended for transmit during an initial ISO 11785 activation period; and
            a second portion of the ISO 11785-formatted full duplex telegram is contained in a portion of the RFID telegram intended for transmit during an extended ISO 11785 activation period.

* * * * *